US011146121B2

(12) United States Patent
Nakao et al.

(10) Patent No.: US 11,146,121 B2
(45) Date of Patent: Oct. 12, 2021

(54) FOREIGN MATERIAL DETECTION APPARATUS

(71) Applicant: OMRON Corporation, Kyoto (JP)

(72) Inventors: Goro Nakao, Inazawa (JP); Takanori Imazawa, Ichinomiya (JP)

(73) Assignee: OMRON Corporation, Kyoto (JP)

(*) Notice: Subject to any disclaimer, the term of this patent is extended or adjusted under 35 U.S.C. 154(b) by 0 days.

(21) Appl. No.: 17/000,396

(22) Filed: Aug. 24, 2020

(65) Prior Publication Data

US 2021/0091605 A1    Mar. 25, 2021

(30) Foreign Application Priority Data

Sep. 25, 2019    (JP) .............................. JP2019-174222

(51) Int. Cl.
*H02J 50/60*    (2016.01)
*H04B 5/00*    (2006.01)
*H02J 50/12*    (2016.01)

(52) U.S. Cl.
CPC .............. *H02J 50/60* (2016.02); *H02J 50/12* (2016.02); *H04B 5/0037* (2013.01); *H04B 5/0093* (2013.01)

(58) Field of Classification Search
CPC ...................................................... H02J 50/60
See application file for complete search history.

(56) References Cited

U.S. PATENT DOCUMENTS

| | | | | |
|---|---|---|---|---|
| 2014/0015522 A1* | 1/2014 | Widmer | ................ | B60L 3/0046 324/239 |
| 2015/0311725 A1* | 10/2015 | Yamamoto | .............. | H02J 50/10 307/104 |
| 2015/0331135 A1* | 11/2015 | Widmer | ................. | G01V 3/101 324/234 |
| 2015/0355360 A1* | 12/2015 | Miyashita | ............... | H02J 50/10 320/108 |
| 2016/0238731 A1* | 8/2016 | Chopra | .................... | H02J 50/10 |
| 2017/0033615 A1* | 2/2017 | Asanuma | ................ | H02J 5/005 |
| 2018/0198323 A1* | 7/2018 | Widmer | ................ | B60L 53/124 |
| 2019/0027973 A1* | 1/2019 | Baek | ...................... | B60L 53/126 |
| 2020/0091776 A1* | 3/2020 | Kondo | .................... | H02J 50/60 |

FOREIGN PATENT DOCUMENTS

JP    2018-207764 A    12/2018

* cited by examiner

*Primary Examiner* — Adi Amrany
(74) *Attorney, Agent, or Firm* — Metrolex IP Law Group, PLLC

(57) ABSTRACT

A foreign material detection apparatus has, between a transmitter coil of a power transmitting apparatus and a receiver coil of a power receiving apparatus between which power is transmitted contactlessly, a plurality of first detection coils arranged to be inductively couplable with each other and each constituting a resonant circuit having a first resonant frequency together with a first capacitor, a plurality of second detection coils arranged to be inductively couplable with each other and each constituting a resonant circuit having a second resonant frequency together with a second capacitor, a power supply circuit that supplies, to each detection coil, AC power having a frequency at which the detection coil resonates, and a detection circuit that detects foreign material contamination between the transmitter coil and the receiver coil according to a voltage of the AC power transmitted via the detection coils.

4 Claims, 13 Drawing Sheets

FOREIGN MATERIAL DETECTION APPARATUS

CROSS-REFERENCES TO RELATED APPLICATIONS

This application claims priority to Japanese Patent Application No. 2019-174222 filed Sep. 25, 2019, the entire contents of which are incorporated herein by reference.

FIELD

The present disclosure relates to a foreign material detection apparatus for detecting foreign material within a power transmission system in which electric power is transmitted contactlessly.

BACKGROUND

Conventionally, so-called contactless power supply (also referred to as wireless power supply) technologies for transmitting power through space without passing via metal contact points or the like have been studied. As one such contactless power supply technology, a method of supplying power by electromagnetic induction is known. With the method of supplying power by electromagnetic induction, inductive coupling between a coil (hereinafter, transmitter coil) on the primary side (power transmitting side or power supply side) and a coil (hereinafter, receiver coil) on the secondary side (power receiving side) results in power being transmitted from the transmitter coil to the receiver coil.

In a power transmission system utilizing such a contactless power supply technology, foreign material such as metal may get between the transmitter coil and the receiver coil. In such cases, the foreign material is induction heated during power transmission and ignites or the apparatus malfunctions due to the heat generated by the foreign material. Also, in such a power transmission system, the relative positional relationship between the transmitter coil and the receiver coil varies during power transmission, and the degree of coupling between the transmitter coil and the receiver coil may change as a result. In view of this, a technology for preventing malfunction caused by foreign material contamination between the transmitter coil and the receiver coil even when the degree of coupling between the transmitter coil and the receiver coil changes has been proposed (see JP 2018-207764A). With this technology, if the contactless power supply apparatus does not perform constant voltage output, even when the frequency of AC (alternating current) power that is supplied to the transmitter coil of the power transmitting apparatus provided in the contactless power supply apparatus is changed over a predetermined frequency domain, the contactless power supply apparatus stops power supply to the transmitter coil, having determined that foreign material of some sort has gotten between the transmitter coil and the receiver coil provided in the power receiving apparatus.

JP 2018-207764A is an example of background art.

However, in the case where very small foreign material gets between the transmitter coil and the receiver coil, the power transmission characteristics from the power transmitting apparatus to the power receiving apparatus do not change, and the foreign material that has gotten between the transmitter coil and the receiver coil may not be detected as a result.

In view of the above described and other drawbacks, a foreign material detection apparatus is provided that is able to improve the detection accuracy of foreign material contamination between a transmitter coil of an apparatus on the power transmitting side and a receiver coil of an apparatus on the power receiving side.

SUMMARY

A foreign material detection apparatus is provided in one or more aspects. The foreign material detection apparatus has a plurality of first detection coils arranged to be inductively couplable with each other on a substrate arranged between a transmitter coil of a power transmitting apparatus and a receiver coil of a power receiving apparatus between which power is transmitted contactlessly, a plurality of first capacitors each constituting a first resonant circuit having a first resonant frequency together with a different one of the plurality of first detection coils, a plurality of second detection coils arranged to be inductively couplable with each other on the substrate, a plurality of second capacitors each constituting a second resonant circuit having a second resonant frequency different from the first resonant frequency together with a different one of the plurality of second detection coils, at least one power supply circuit configured to supply AC power having a first frequency at which each of the first resonant circuits is resonatable to a first input coil among the plurality of first detection coils, and to supply AC power having a second frequency at which each of the second resonant circuits is resonatable to a second input coil among the plurality of second detection coils, and a detection circuit configured to detect a first voltage of the AC power transmitted via the plurality of first detection coils, from a first output coil different from the first input coil among the plurality of first detection coils, to detect a second voltage of the AC power transmitted via the plurality of second detection coils, from a second output coil different from the second input coil among the plurality of second detection coils, and to detect foreign material contamination between the transmitter coil and the receiver coil according to the detected first voltage or second voltage. The foreign material detection apparatus according to one or more aspects, as a result of having such a configuration, is able to improve the detection accuracy of foreign material contamination between the transmitter coil of the apparatus on the power transmitting side and the receiver coil of the apparatus on the power receiving side.

In this foreign material detection apparatus, the plurality of first detection coils and the plurality of second detection coils are arranged alternately as viewed from a normal direction of the substrate. With this foreign material detection apparatus, because foreign material that has gotten between the transmitter coil and the receiver coil will be located near one of the plurality of first detection coils and plurality of second detection coils, one of the first voltage or second voltage varies to a sufficient degree due to contamination by foreign material for the foreign material to thereby be detected. Thus, this foreign material detection apparatus is able to accuracy detect foreign material contamination, regardless of the location of the foreign material.

Also, in this foreign material detection apparatus, the first frequency is a frequency at which each of the second resonant circuits does not resonate, and the second frequency is a frequency at which each of the first resonant circuits does not resonate. AC power having the first frequency thereby does not affect the second resonant circuits, and, conversely, AC power having the second frequency does not affect the first resonant circuits. Thus, in the case where foreign material is located near any of the plurality of first detection coils, the first voltage varies to a sufficient degree for the foreign material to be detected. Similarly, in the case where foreign material is located near any of the plurality of second detection coils, the second voltage varies to a sufficient degree for the foreign material to be detected. Thus, this foreign material detection apparatus is able to accuracy detect foreign material contamination, regardless of the location of the foreign material.

DETAILED DESCRIPTION

Figure 1:
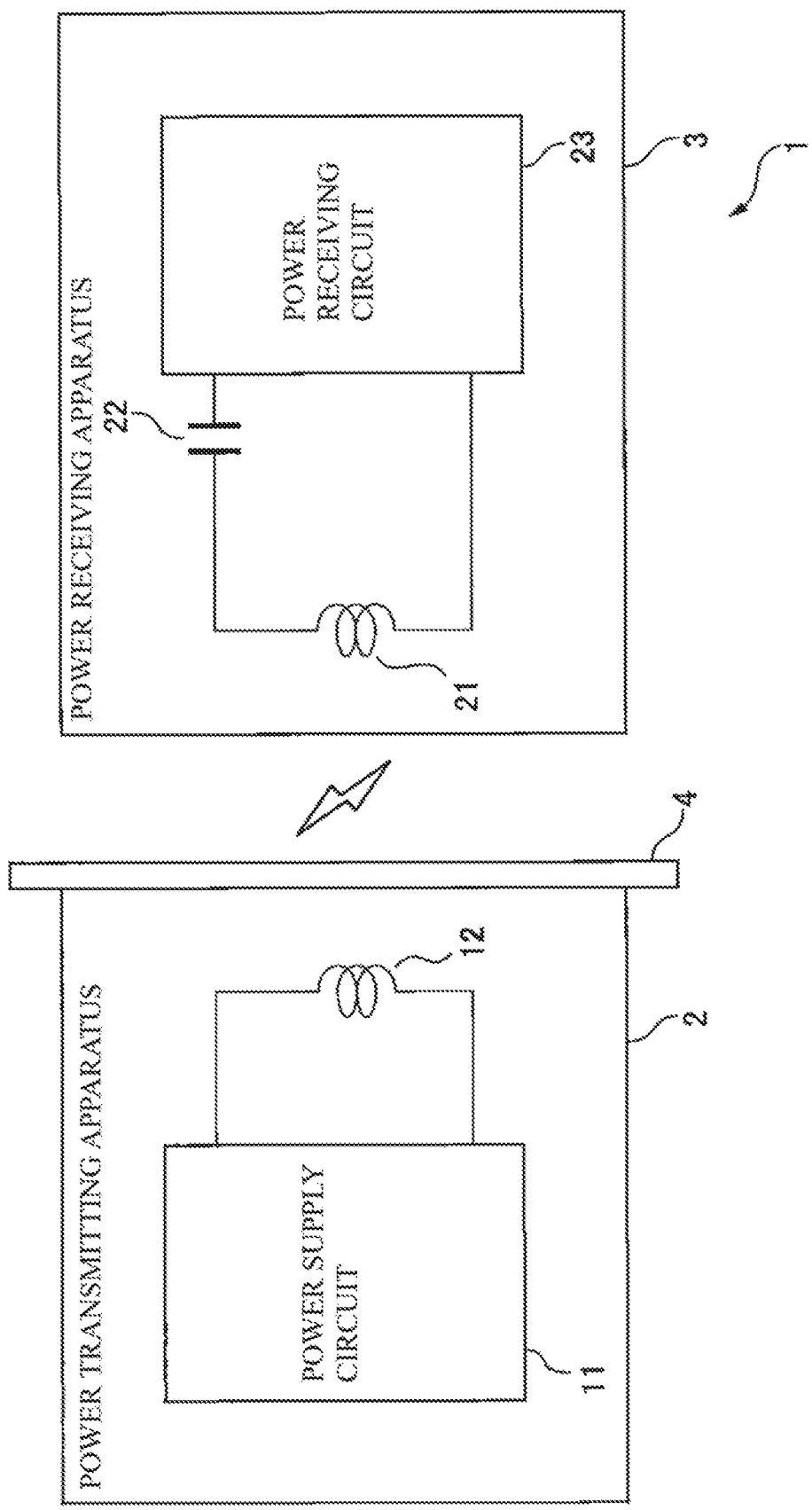
FIG. 1 is a schematic configuration diagram of a power transmission system that includes a foreign material detection apparatus according to one or more embodiments.

Hereinafter, a foreign material detection apparatus according to one or more embodiments will be described, with reference to the drawings. The foreign material detection apparatus has a substrate that is arranged between a transmitter coil of an apparatus on the power transmitting side (hereinafter, simply referred to as the power transmitting apparatus) and a receiver coil of an apparatus on the power receiving side (hereinafter, simply referred to as the power receiving apparatus) that are provided in a power transmission system that transmits power contactlessly, and has a plurality of first detection coils that are arranged to be inductively couplable with each other and a plurality of second detection coils that are arranged to be inductively couplable with each other, the first and second detection coils being formed on the substrate. Each of the plurality of first detection coils constitutes a first resonant circuit together with a first capacitor connected to that first detection coil. Also, each of the first resonant circuits has a first resonant frequency different from the frequency (hereinafter, for convenience of description, referred to as the transmission frequency) of power that is supplied to the transmitter coil of the power transmitting apparatus, and at which the resonant circuit including the transmitter coil (in the case where a resonant circuit is provided on the power transmitting side) and the resonant circuit including the receiver coil both do not resonate. Similarly, each of the plurality of second detection coils constitutes a second resonant circuit together with a second capacitor connected to that second detection coil. Also, each of the second resonant circuits has a second resonant frequency different from the transmission frequency and the first resonant frequency, and at which the resonant circuit including the transmitter coil and the resonant circuit including the receiver coil both do not resonate. This foreign material detection apparatus supplies AC power having a first frequency at which each of the first resonant circuits is resonatable to a first input coil that is one of the plurality of first detection coils, and, on the other hand, detects a first voltage output by a first output coil that is another one of the plurality of first detection coils. Similarly, this foreign material detection apparatus supplies AC power having a second frequency at which each of the second resonant circuits is resonatable to a second input coil that is one of the plurality of second detection coils, and, on the other hand, detects a second voltage output by a second output coil that is another one of the plurality of second detection coils.

When foreign material having conductivity such as metal gets between the transmitter coil and the receiver coil, the resonant characteristics of one of the plurality of first resonant circuits or plurality of second resonant circuits changes, and at least one of the detected first voltage and second voltage changes as a result. In particular, even when foreign material gets into a location where there is little variation in the resonant characteristics of any of the plurality of first resonant circuits, the resonant characteristics of one of the plurality of second resonant circuits will relatively change greatly, and, conversely, even when foreign material gets into a location where there is little variation in the resonant characteristics of any of the plurality of second resonant circuits, the resonant characteristics of one of the plurality of first resonant circuits will relatively change greatly. As the result, at least one of the first voltage and second voltage changes greatly when contamination by foreign material occurs.

In view of the above described and other drawbacks, the foreign material detection apparatus monitors the first voltage and second voltage that are detected, and determines that there is foreign material contamination between the transmitter coil and the receiver coil when at least one of the first voltage and second voltage falls outside a predetermined reference range corresponding to the case where there is no contamination by foreign material. This foreign material detection apparatus is thereby able to accuracy detect foreign material, regardless of the location of foreign material that has gotten between the transmitter coil and the receiver coil.

FIG. 1 is a schematic configuration diagram of a power transmission system including a foreign material detection apparatus according to one or more embodiments. As shown in FIG. 1, a power transmission system 1 has a power transmitting apparatus 2, a power receiving apparatus 3, and a foreign material detection apparatus 4. The power transmitting apparatus 2 and the power receiving apparatus 3 constitute a contactless power supply apparatus, with power being transmitted from the power transmitting apparatus 2 to the power receiving apparatus 3 contactlessly through space. The power transmitting apparatus 2 has a power supply circuit 11 and a transmitter coil 12. On the other hand, the power receiving apparatus 3 has a receiver coil 21, a resonant capacitor 22, and a power receiving circuit 23. The power transmission system 1 can, for example, be configured as a contactless power supply apparatus employing a so-called series-series resonant capacitor system (SS system) or series-parallel resonant capacitor system (SP system). Alternatively, the power transmission system 1 may be a contactless power supply apparatus employing a system in which resonance is not utilized on the primary side and the receiver coil and the resonant capacitor resonate in series on the secondary side (NS system), or a system in which resonance is not utilized on the primary side and the receiver coil and the resonant capacitor resonate in parallel on the secondary side (NP system).

First, the power transmitting apparatus 2 will be described. The power supply circuit 11 supplies AC power to the transmitter coil 12. Thus, the power supply circuit 11 has, for example, a DC (direct current) power source that supplies DC power, an inverter circuit that converts the DC power supplied from the DC power source into AC power and supplies the AC power to the transmitter coil 12, and a control circuit that controls the inverter circuit. The inverter circuit may be a full-bridge inverter in which four switching devices (e.g., MOSFETs) are connected in a full-bridge configuration, or may be a half-bridge inverter in which two switching devices are connected in a half-bridge configuration. The control circuit controls the ON/OFF switching of each switching device of the inverter circuit, such that the frequency of the AC power that is supplied to the transmitter coil 12 achieves a predetermined frequency (e.g., frequency at which the resonant circuit of the power receiving apparatus 3 resonates). The power supply circuit 11 may further have a DC-DC converter between the DC power source and the inverter circuit. Alternatively, the power supply circuit 11 may, instead of a DC power source, have a rectifier circuit that is connected to an AC power source and rectifies the AC power from the AC power source, and a power factor correction circuit that is connected to the rectifier circuit and converts PDC (pulsed direct current) power that is output by the rectifier circuit into DC power. In this case, the control circuit may, for example, control the power factor correction circuit to adjust the voltage of the DC power that is supplied to the inverter circuit, in order to maintain the voltage of power that is received by the power receiving apparatus 3 at a constant level.

The transmitter coil 12 transmits AC power supplied from the power supply circuit 11 to the receiver coil 21 of the power receiving apparatus 3 through space. Note that the power transmitting apparatus 2 may have a capacitor that is connected in series with the transmitter coil 12, between the transmitter coil 12 and the inverter circuit of the power supply circuit 11. This capacitor may be for cutting off DC power or may be for constituting a resonant circuit that resonates together with the transmitter coil 12 at the frequency of AC power that is supplied to the transmitter coil 12.

Note that the power transmitting apparatus 2 may further have a communicator that receives a signal indicating the power receiving state of the power receiving apparatus 3. In this case, the control circuit of the power supply circuit 11 may change the timing of the ON/OFF switching of each switching device of the inverter circuit, so as to change the frequency of AC power that is supplied to the transmitter coil 12, according to the power receiving state.

Furthermore, the control circuit of the power supply circuit 11 may stop power supply from the power supply circuit 11 to the transmitter coil 12, by turning OFF the switching devices of the inverter, when a signal indicating that foreign material contamination between the transmitter coil 12 and the receiver coil 21 was detected is received from the foreign material detection apparatus 4.

Next, the power receiving apparatus 3 will be described. The receiver coil 21 constitutes a resonant circuit together with the resonant capacitor 22, and receives power from the transmitter coil 12, by resonating with the AC current that flows through the transmitter coil 12 of the power transmitting apparatus 2. Thus, the resonant capacitor 22 may be connected in series with the receiver coil 21 or may be connected in parallel with the receiver coil 21. The AC power that is output by the resonant circuit formed by the receiver coil 21 and the resonant capacitor 22 is output to the power receiving circuit 23. Note that the number of turns of the receiver coil 21 and the number of turns of the transmitter coil 12 may be the same or may differ from each other.

The power receiving circuit 23 converts the AC power from the resonant circuit that is formed by the receiver coil 21 and the resonant capacitor 22 into DC power, and outputs the DC power to a load circuit (not shown) that is connected to the power receiving circuit 23. Thus, the power receiving circuit 23 has, for example, a full-wave rectifier circuit that convert AC power from the resonant circuit into PDC power, and a smoothing capacitor for smoothing the PDC power that is output by the full-wave rectifier circuit and outputting the smoothed power to the load circuit. Furthermore, the power receiving circuit 23 may have a voltmeter for measuring the voltage that is output to the load circuit, a communicator for transmitting a signal indicating the power receiving state, such as the voltage measured by the voltmeter, to the power transmitting apparatus 2, a switching device for switching between connection and disconnection of the load circuit and the power receiving circuit 23, and a control circuit that controls the ON/OFF switching of the switching device.

Next, the foreign material detection apparatus 4 according to the present embodiment will be described. The foreign material detection apparatus 4 is arranged between the transmitter coil 12 and the receiver coil 21 in the case where the power transmitting apparatus 2 and the power receiving apparatus 3 are in a power transmissible positional relationship, that is, where the transmitter coil 12 and the receiver coil 21 are in an inductively couplable positional relationship. The foreign material detection apparatus 4 detects foreign material having conductivity, such as metal, that has gotten between the transmitter coil 12 and the receiver coil 21.

Figure 2:
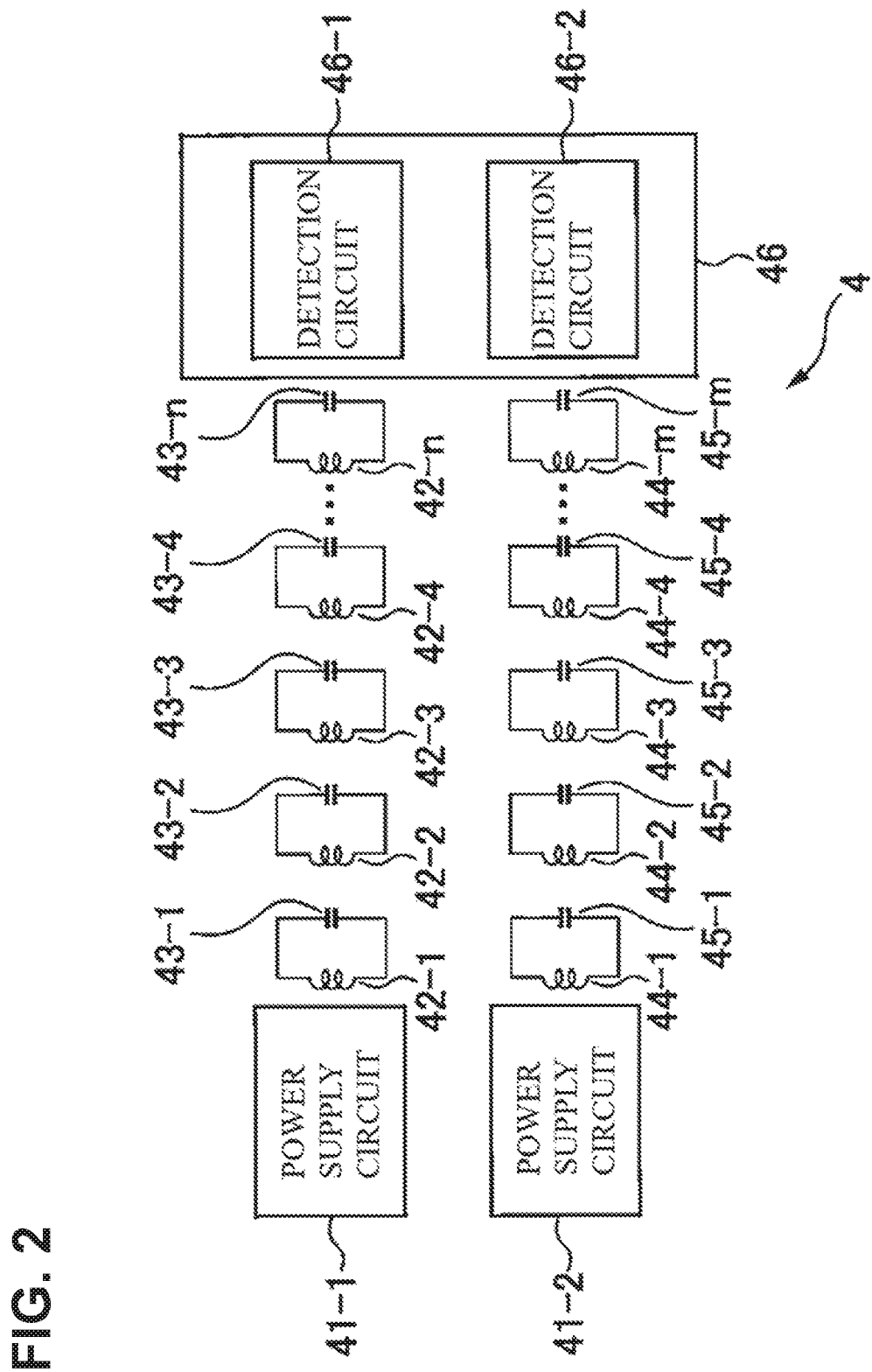
FIG. 2 is a schematic configuration diagram of the foreign material detection apparatus.
Figure 3:
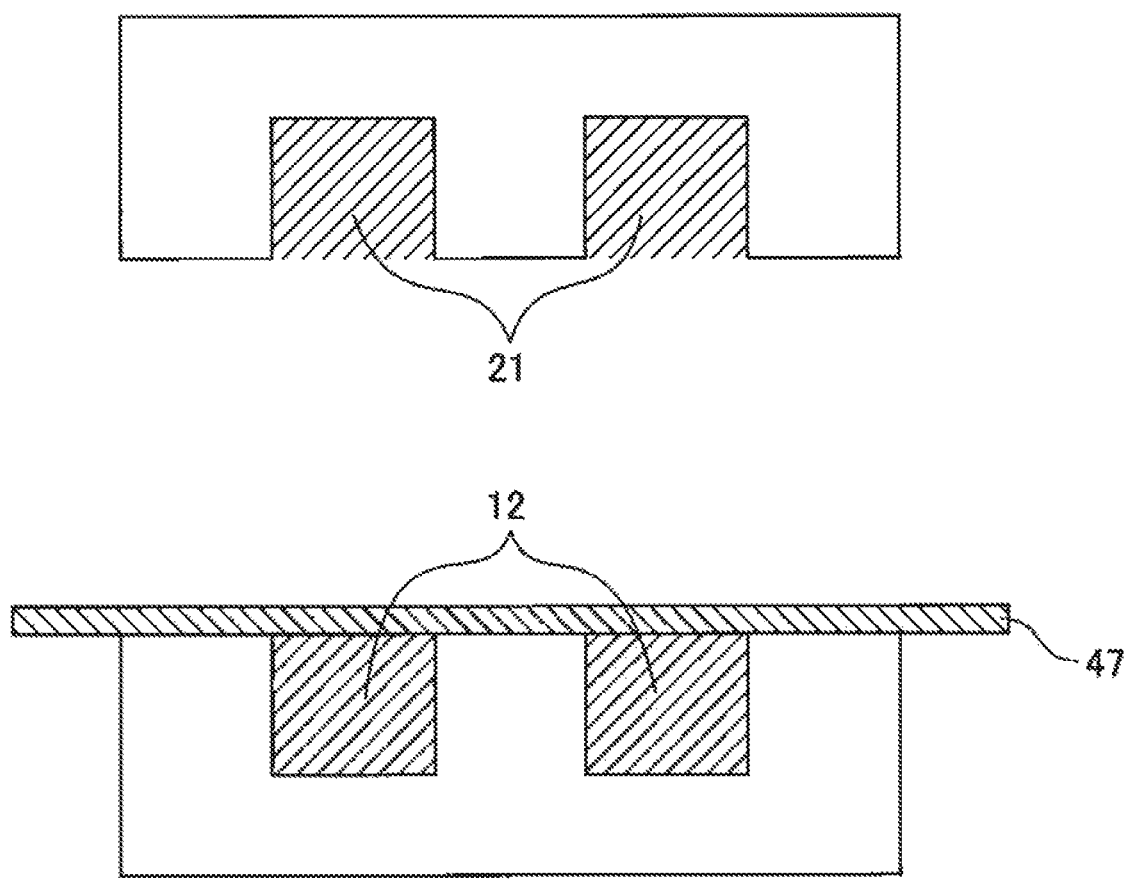
FIG. 3 is a schematic side cross-sectional view showing an example of a positional relationship between a substrate on which the foreign material detection apparatus is provided and a transmitter coil.
Figure 4:
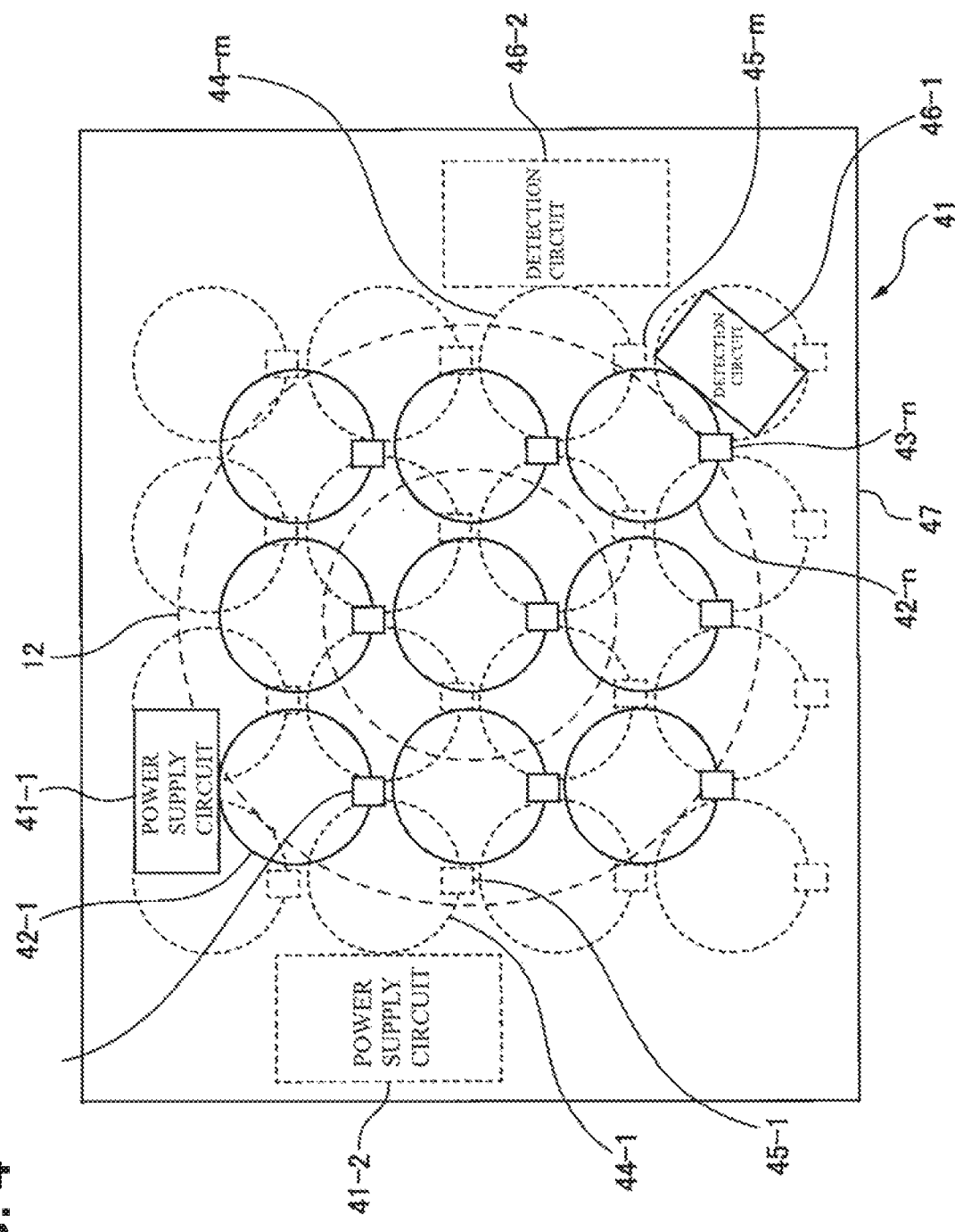
FIG. 4 is a schematic plan view showing an example of the arrangement of detection coils provided in the foreign material detection apparatus.

FIG. 2 is a schematic configuration diagram of the foreign material detection apparatus 4. FIG. 3 is a schematic side cross-sectional view showing an example of the positional relationship between the substrate on which the foreign material detection apparatus 4 is provided and the transmitter coil 12. Furthermore, FIG. 4 is a schematic plan view showing an example of the arrangement of the detection coils of the foreign material detection apparatus 4.

As shown in FIG. 2, the foreign material detection apparatus 4 has two power supply circuits 41-1 and 41-2, a plurality of first detection coils 42-1 to 42-$n$ (where n is an integer greater than or equal to 2), a plurality of first capacitors 43-1 to 43-$n$, a plurality of second detection coils 44-1 to 44-$m$ (where m is an integer greater than or equal to 2), a plurality of second capacitors 45-1 to 45-$m$, and a detection circuit 46. In the present embodiment, the detection circuit 46 includes two detection circuits 46-1 and 46-2. These elements of the foreign material detection apparatus 4 are provided on a substrate 47 that is located between the transmitter coil 12 and the receiver coil 21 in the case where the transmitter coil 12 and the receiver coil 21 are in an inductively couplable positional relationship. In the present embodiment, the substrate 47 is attached to the power transmitting apparatus 2. Signals indicating the results of foreign material detection of the detection circuits 46-1 and 46-2 are output to the power supply circuit 11 of the power transmitting apparatus 2.

Next, the power supply circuits 41-1 and 41-2 will be described in detail. In the present embodiment, the power supply circuits 41-1 and 41-2 can be constituted the same, except for the difference in the frequencies of AC power that is supplied. In view of this, hereinafter, the power supply circuit 41-1 will be mainly described, and description will be given of the differences of the power supply circuit 41-2 from the power supply circuit 41-1.

Figure 5:
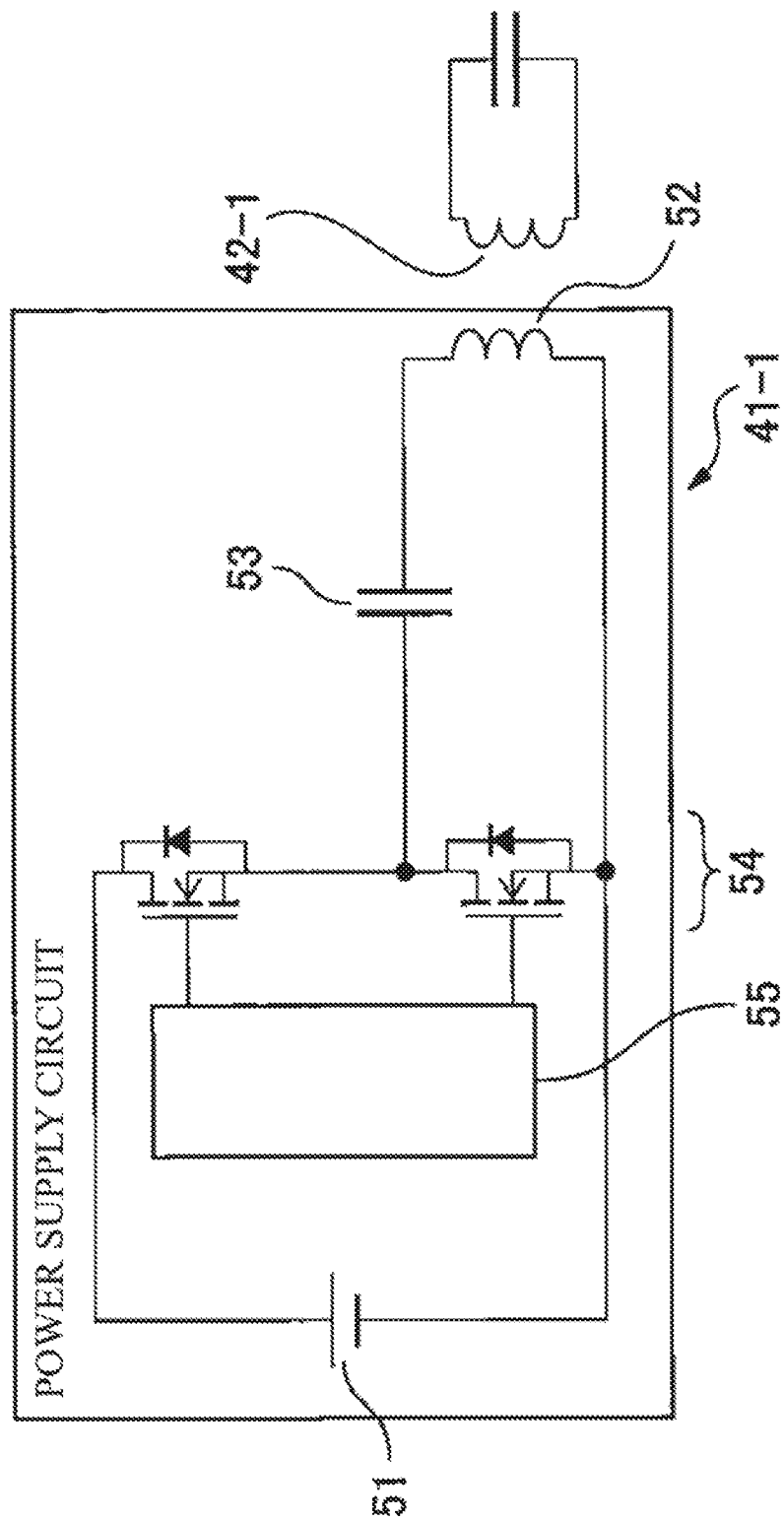
FIG. 5 is a circuit configuration diagram showing an example of a power supply circuit.

FIG. 5 is a circuit configuration diagram showing an example of the power supply circuit 41-1, The power supply circuit 41-1 has, for example, a DC power source 51 that supplies DC power, a power supply coil 52, a capacitor 53, an inverter circuit 54, and a control circuit 55 that controls the inverter circuit 54.

The power supply coil 52 is connected at one end to the inverter circuit 54 via the capacitor 53, and the other end is grounded. The power supply coil 52 is arranged to be inductively couplable with a first input coil (in the present embodiment, detection coil 42-1), which is one of the plurality of first detection coils 42-1 to 42-$n$, and supplies the AC power supplied from the inverter circuit 54 to the first input coil. Note that the connection order of the power supply coil 52 and the capacitor 53 may be interchanged. Note that, with regard to the power supply circuit 41-2, the power supply coil 52 is arranged to be inductively couplable with a second input coil (in the present embodiment, detection coil 44-1), which is one of the plurality of second detection coils 44-1 to 44-$m$, and supplies the AC power supplied from the inverter circuit 54 to the second input coil.

The inverter circuit 54 converts the DC power supplied from the DC power source 51 into AC power and supplies the AC power to the power supply coil 52. In this example, the inverter circuit 54 is constituted as a half-bridge inverter to which two switching devices (e.g., MOSFETs) are connected in a half-bridge configuration, but the inverter circuit 54 may be a full-bridge inverter to which four switching devices are connected in a full-bridge configuration. The control circuit 55 controls the ON/OFF switching of each switching device of the inverter circuit, such that the frequency of the AC power supplied to the power supply coil 52 achieves a first frequency at which the first resonant circuit constituted by a first detection coil 42-$i$ ($i=1, 2, \ldots, n$) and a first capacitor 43-$i$ and having the first resonant frequency is resonatable. That is, the first frequency need only be a frequency at which the supplied AC power can propagate through each of the first detection coils, and can, for example, be set to the first resonant frequency itself. Also, with regard the power supply circuit 41-2, the control circuit 55 controls the ON/OFF switching of each switching device of the inverter circuit, such that the frequency of the AC power that is supplied to the power supply coil 52 achieves a second frequency at which the second resonant circuit constituted by a second detection coil 44-$i$ ($i=1, 2, \ldots, m$) and a second capacitor 45-$i$ and having the second resonant frequency is resonatable. That is, the second frequency need only be a frequency at which the supplied AC power can propagate through each of the second detection coils, and can, for example, be set to the second resonant frequency itself.

As described above, in relation to the power supply circuit 41-1, the first frequency of the AC power that is supplied to the first input coil from the power supply circuit 41-1 via the power supply coil 52 is different from the transmission frequency of the AC power that is supplied to the transmitter coil 12 of the power transmitting apparatus 2, and is preferably set to a frequency at which the resonant circuit including the transmitter coil 12 and the resonant circuit including the receiver coil 21 both do not resonate. Furthermore, in relation to the power supply circuit 41-2, the second frequency of the AC power that is supplied to the second input coil from the power supply circuit 41-2 via the power supply coil 52 is different from the transmission frequency, and is preferably set to a frequency at which the resonant circuit including the transmitter coil 12 and the resonant circuit including the receiver coil 21 both do not resonate. Furthermore, the first frequency and the second frequency differ from each other, with the first frequency preferably being a frequency at which each of the second resonant circuits does not resonate, and the second frequency preferably being a frequency at which each of the first resonant circuits does not resonate.

For example, the first frequency of the AC power that is supplied by the power supply circuit 41-1 and the second frequency of the AC power that is supplied by the power supply circuit 41-2 can be set to a higher frequency than the transmission frequency (e.g., 85 kHz or 150 kHz), such as 13.56 MHz, 27.12 MHz or 40.68 MHz belonging to the ISM band, for example. Furthermore, the first frequency can be set to 13.56 MHz and the second frequency can be set to 27.12 MHz. The AC power that is supplied from the power supply circuit 41-1 and the AC power that is supplied from the power supply circuit 41-2 are thereby prevented from affecting power transmission from the power transmitting apparatus 2 to the power receiving apparatus 3. Also, as a result of the first frequency and the second frequency being set in this way, each of the plurality of first detection coils 42-1 to 42-$n$ and plurality of second detection coils 44-1 to 44-$m$ that are provided in the foreign material detection apparatus 4 can be set to a relatively small inductance, and thus the detection coils can be easily made smaller in size than the transmitter coil 12.

Furthermore, as a result of the first frequency and the second frequency differing from each other, with the first frequency being a frequency at which each of the second resonant circuits do no resonate and the second frequency being a frequency at which each of the first resonant circuits does not resonate, the resonant characteristics of one of the second resonant circuits will relatively change greatly due to foreign material, even if the resonant characteristics of the first resonant circuits do not change very much due to the foreign material. Conversely, the resonant characteristics of one of the first resonant circuits will relatively change greatly due to foreign material, even if the resonant characteristics of the second resonant circuits do not change very much due to the foreign material. Thus, the detection accuracy of foreign material improves.

Referring again to FIGS. 3 and 4, each of the plurality of first detection coils 42-1 to 42-$n$ are constituted as a wiring pattern by a conductor such as metal that is provided on the substrate 47, The first detection coil 42-$i$ (i=1, 2, . . . , n) and the corresponding first capacitor 43-$i$ are connected to each other, and constitute one first resonant circuit. The inductance of the first detection coil 42-$i$ and the capacitance of the first capacitor 43-$i$ are preferably set such that the first resonant frequency of the first resonant circuit that is constituted by that first detection coil and first capacitor achieves a frequency that does result in the first resonant circuit resonating at the transmission frequency of the AC power that is supplied to the transmitter coil 12. Because each of the first resonant circuits does not resonate to the AC power that is transmitted from the power transmitting apparatus 2 to the power receiving apparatus 3, the foreign material detection apparatus 4 is thereby able to prevent the AC power transmitted from the power transmitting apparatus 2 to the power receiving apparatus 3 from affecting the detection of foreign material. Furthermore, the inductance of the first detection coil 42-$i$ and the capacitance of the first capacitor 43-$i$ are preferably set such that each of the first resonant circuits resonates at the first frequency of the AC power that is supplied from the power supply circuit 41-1. Because loss that occurs before the AC power that is supplied from the power supply circuit 41-1 reaches the detection circuit 46-1 is suppressed, the foreign material detection apparatus 4 is thereby able to suppress deterioration in the detection accuracy of foreign material. As described above, the first resonant frequency and the first frequency need not coincide, as long as the AC power that is supplied from the power supply circuit 41-1 reaches the detection circuit 46-1 after propagating through each of the first resonant circuits.

Similarly, each of the plurality of second detection coils 44-1 to 44-$m$ are constituted as a wiring pattern by a conductor such as metal that is provided on the substrate 47. The second detection coil 44-$i$ (i=1, 2, . . . , m) and the corresponding second capacitor 45-$i$ are connected to each other, and constitute one second resonant circuit. The inductance of the second detection coil 44-$i$ and the capacitance of the second capacitor 45-$i$ are preferably set such that the second resonant frequency of the second resonant circuit constituted by that second detection coil and second capacitor achieves a frequency that does not result in the second resonant circuit resonating at the transmission frequency of the AC power that is supplied to the transmitter coil 12. Because each of the second resonant circuits does not resonate to the AC power that is transmitted from the power transmitting apparatus 2 to the power receiving apparatus 3, the foreign material detection apparatus 4 is thereby able to prevent the AC power transmitted from the power transmitting apparatus 2 to the power receiving apparatus 3 from affecting the detection of foreign material. Furthermore, the inductance of the second detection coil 44-$i$ and the capacitance of the second capacitor 45-$i$ are preferably set such that each of the second resonant circuits resonates at the second frequency of the AC power that is supplied from the power supply circuit 41-2. Because loss that occurs before the AC power that is supplied from the power supply circuit 41-2 reaches the detection circuit 46-2 is suppressed, the foreign material detection apparatus 4 is able to suppress deterioration in the detection accuracy of foreign material. As described above, the second resonant frequency and the second frequency need not coincide, as long as the AC power that is supplied from the power supply circuit 41-2 reaches the detection circuit 46-2 after propagating through each of the second resonant circuits.

Also, each of the plurality of first detection coils 42-1 to 42-$n$ is arranged on one surface of the substrate 47 (e.g., the surface facing the receiver coil 21; hereinafter, referred to for convenience as the front surface), so as to not be in electrical contact with each other and to be inductively couplable with each other. For example, each of the plurality of first detection coils 42-1 to 42-$n$ is arranged on the front surface of the substrate 47 so as to be directly inductively couplable with another one or more of the plurality of first detection coils. Furthermore, the power supply circuit 41-1 and the detection circuit 46-1 are also arranged on the front surface of the substrate 47. Accordingly, the AC power supplied from the power supply circuit 41-1 is transmitted to the detection circuit 46-1, as a result of each of the first detection coils resonating with the corresponding first capacitor to the supplied AC power.

Similarly, each of the plurality of second detection coils 44-1 to 44-$m$ is arranged on the other surface of the substrate 47 (e.g., the surface facing the transmitter coil 12; hereinafter, referred to for convenience as the back surface), so as to not be in electrical contact with each other and to be inductively couplable with each other. For example, each of the plurality of second detection coils 44-1 to 44-$n$ is arranged on the back surface of the substrate 47 so as to be directly inductively couplable with another one or more of the plurality of second detection coils. Furthermore, the power supply circuit 41-2 and the detection circuit 46-2 are also arranged on the back surface of the substrate 47. Accordingly, the AC power supplied from the power supply circuit 41-2 is transmitted to the detection circuit 46-2, as a result of each of the second detection coils resonating with the corresponding second capacitor to the supplied AC power.

Note that, opposite to the example shown in FIG. 4, the power supply circuit 41-1, the plurality of first detection coils 42-1 to 42-$n$ and the detection circuit 46-1 may be are arranged on the back surface of the substrate 47, and the power supply circuit 41-2, the plurality of second detection coils 44-1 to 44-$m$ and the detection circuit 46-2 may be arranged on the front surface of the substrate 47. Also, the plurality of first detection coils 42-1 to 42-$n$ and the plurality of second detection coils 44-1 to 44-$m$ may be arranged on the same surface of the substrate 47.

The substrate 47 is arranged such that the central axis direction of the transmitter coil 12 and the normal direction of the substrate 47 will be approximately parallel. The plurality of first detection coils 42-1 to 42-$n$ and the plurality of second detection coils 44-1 to 44-$m$ are arranged so as to cover the entire transmitter coil 12, when the transmitter coil 12 is viewed from the central axis direction.

Furthermore, the plurality of first detection coils 42-1 to 42-$n$ and the plurality of second detection coils 44-1 to 44-$rn$ are arranged alternately as viewed from the normal direction of the substrate 47. Thereby, even if foreign material that has gotten between the transmitter coil 12 and the receiver coil 21 is located outside the windings of all of the first detection coils, the foreign material will be located within the windings of one of the second detection coils. Thus, because one of the second detection coils will be greatly affected by the foreign material, the second voltage varies greatly, even though there is little variation in the first voltage. Conversely, even if the foreign material is located outside the windings of all of the second detection coils, the foreign material will be located within the windings of one of the first detection coils. Thus, because one of the first detection coils will be greatly affected by the foreign material, the first voltage varies greatly, even though there is little variation in the second voltage. In this way, at least one of the first voltage and second voltage varies greatly, regardless of the location of the foreign material contamination, thus enabling the foreign material detection apparatus 4 to accurately detect the foreign material.

Note that, in the example shown in FIG. 4, each of the plurality of first detection coils 42-1 to 42-$n$ and plurality of second detection coils 44-1 to 44-$m$ are formed in an approximately circular shape, but the shape of each detection coil is not limited to a circular shape, and may, for example, be an elliptical shape or a rectangular shape. Also, the shape and size of the plurality of first detection coils 42-1 to 42-$n$ and plurality of second detection coils 44-1 to 44-$m$ may be the same as each other or may differ from each other. Furthermore, each the plurality of first detection coils 42-1 to 42-$n$ and plurality of second detection coils 44-1 to 44-$m$, as viewed from the central axis direction of the transmitter coil 12, is preferably smaller in size than the transmitter coil 12. Thereby, even if foreign material that is smaller than the transmitter coil 12 gets between the transmitter coil 12 and the receiver coil 21, one of the plurality of first detection coils 42-1 to 42-$n$ and plurality of second detection coils 44-1 to 44-$m$ will be readily affected by the foreign material, thus enabling the foreign material detection apparatus 4 to accurately detect such small foreign material.

Next, the detection circuits 46-1 and 46-2 will be described.

The detection circuit 46-1 detects the first voltage of AC power transmitted via the plurality of first detection coils 42-1 to 42-$n$, and detects foreign material contamination between the transmitter coil 12 and the receiver coil 21, based on the detected first voltage. Similarly, the detection circuit 46-2 detects the second voltage of AC power transmitted via the plurality of second detection coils 44-1 to 44-$m$, and detects foreign material contamination between the transmitter coil 12 and the receiver coil 21, based on the detected second voltage.

In the present embodiment, the detection circuit 46-1 and the detection circuit 46-2 can be constituted to have the same configuration, and thus, hereinafter, the detection circuit 46-1 will be described. In the following description, in relation to the detection circuit 46-2, the first detection coils need only be read as the second detection coils, the power supply circuit 41-1 need only be read as the power supply circuit 41-2, and the first voltage need only be read as the second voltage.

In the present embodiment, the AC power that is transmitted from the power transmitting apparatus 2 to the power receiving apparatus 3 does not affect transmission of AC power from the power supply circuit 41-1 to the detection circuit 46-1 via the plurality of first detection coils 42-1 to 42-$n$. On the other hand, when foreign material gets between the transmitter coil 12 and the receiver coil 21, the resonant characteristics of one of the plurality of first detection coils 42-1 to 42-$n$ changes, due to the foreign material, and transmission of AC power from the power supply circuit 41-1 to the detection circuit 46-1 is affected. In particular, the effect on transmission is marked in the case where foreign material is located near one of the first detection coils, such as where foreign material is located within the windings of one of the first detection coils, as viewed from the normal direction of the substrate 47, for example. As the result, the first voltage that is detected by the detection circuit 46-1 changes. For example, when metal approaches one of the first detection coils through which current is flowing, as a result of the supplied AC power, loss occurs due to an eddy current being induced in the metal, as a result of magnetic flux that occurs near a first detection coil due to the current. Also, the inductance of the first detection coil drops, due to the magnetic flux caused by the eddy current that is induced. In particular, in the case where the metal is a magnetic body, the loss may become comparatively large, despite the change in inductance being small. As a result of these factors, the resonant characteristics of the first resonant circuit that includes that first detection coil change. In view of this, the detection circuit 46-1 determines whether the detected first voltage is included in a predetermined reference range, and determines that there is foreign material contamination between the transmitter coil 12 and the receiver coil 21, if the detected first voltage falls outside the predetermined reference range. Note that, as the predetermined reference range, only a lower limit may be set, or both an upper limit and a lower limit may be set. In the case where only a lower limit is set, it is determined that the detected first voltage falls outside the predetermined reference range, if the detected first voltage is lower than the lower limit. Also, in the case where both an upper limit and a lower limit are set, it is determined that the detected first voltage falls outside the predetermined reference range, if the detected first voltage is lower than the lower limit or higher than the upper limit.

Note that, in this example, one detection circuit 46-1 is included in the foreign material detection apparatus 4, but the invention according to one or more embodiments is not limited thereto, and the foreign material detection apparatus 4 may have two or more detection circuits 46-1. For example, in FIG. 4, the upper right end and lower left end in the array of the plurality of the first detection coils 42-1 to 42-$n$ do not function all that highly as a transmission path of AC power from the power supply circuit 41-1 to the detection circuit 46-1. In view of this, the detection circuit 46-1 may be added to one or both of the upper right end and the lower left end of the array of the plurality of detection coils 42-1 to 42-$n$. The range over which the foreign material detection apparatus 4 is able to accurately detect foreign material will thereby be expanded. Similarly, the foreign material detection apparatus 4 may have two or more detection circuits 46-2.

Figure 6:
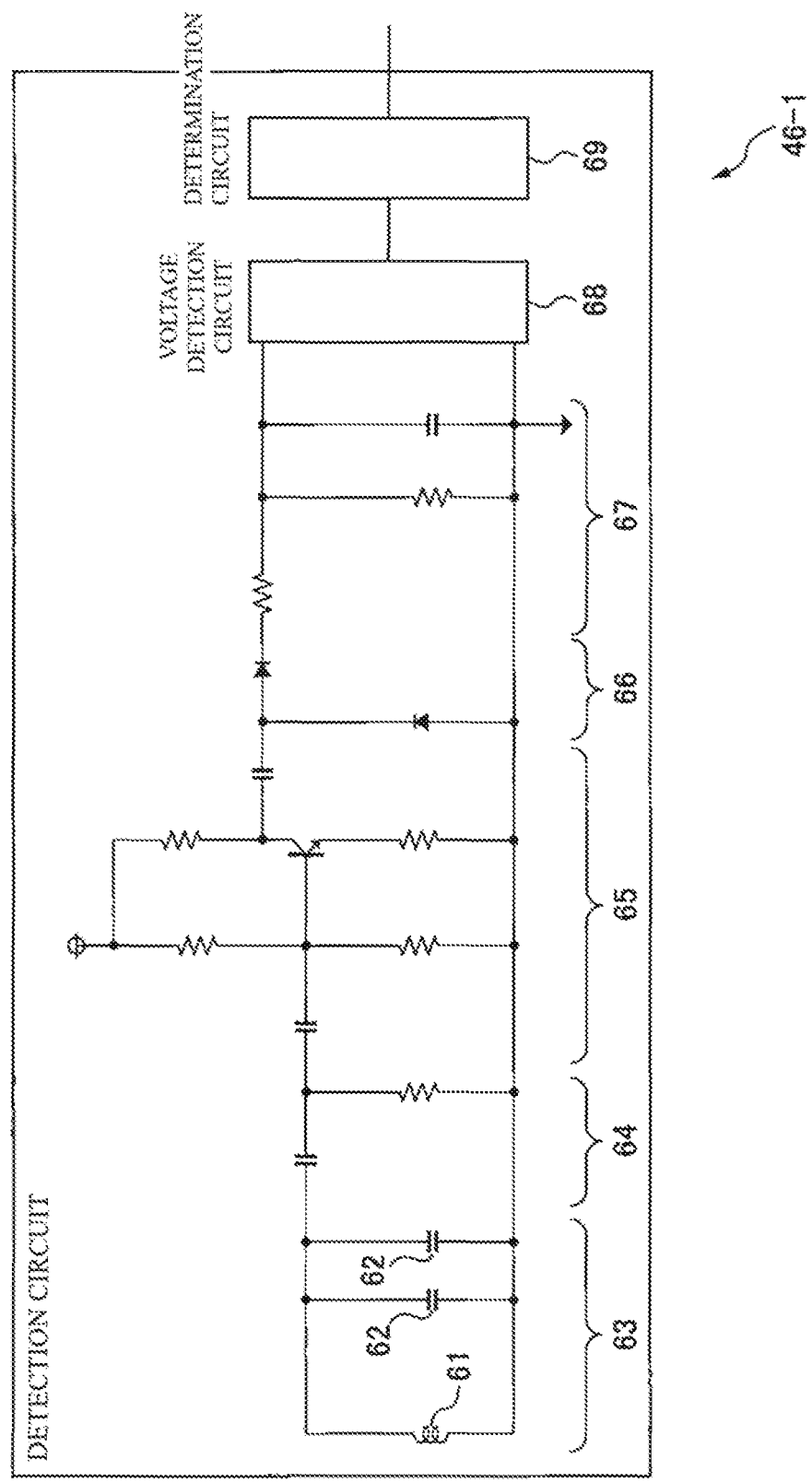
FIG. 6 is a circuit configuration diagram showing an example of a detection circuit.

FIG. 6 is a circuit configuration diagram showing an example of the detection circuit 46-1. The detection circuit 46-1 has a resonant circuit 63 having a receiver coil 61 and a resonant capacitor 62, a high-pass filter 64, an amplifier 65, a half-wave rectifier circuit 66, a low-pass filter 67, a voltage detection circuit 68, and a determination circuit 69. Note that the detection circuit 46-1 is not limited to the circuit configuration shown in FIG. 6, and may be configured as one of various circuits capable of detecting the first voltage of AC power that is transmitted by each of the first detection coils and determining whether the detected first voltage falls outside the predetermined reference range.

The resonant circuit 63 detects the AC power that is supplied from the power supply circuit 41-1 and transmitted via the plurality of first detection coils 42-1 to 42-$n$. Thus, the receiver coil 61 of the resonant circuit 63 is arranged so as to be directly (i.e., not via other first detection coils) inductively couplable with an output coil (in the present embodiment, first detection coil 42-$n$) other than an input coil to which AC power is supplied from the power supply circuit 41-1, out of the plurality of first detection coils 42-1 to 42-$n$. The inductance of the receiver coil 61 and the capacitance of the resonant capacitor 62 are set such that the resonant circuit 63 resonates to the AC power that is supplied from the power supply circuit 41-1. Note that, in FIG. 6, two resonant capacitors 62 are shown to be connected in parallel with the receiver coil 61, but the number of resonant capacitors 62 provided in the resonant circuit 63 is not limited to two, and may be one or may be three or more. Also, the receiver coil 61 and the resonant capacitor 62 may be connected in series.

Note that the output coil (detection coil 42-$n$) which is inductively couplable with the receiver coil 61 is preferably a detection coil that is not directly inductively couplable with the input coil (first detection coil 42-1) to which AC power is supplied from the power supply circuit 41-1, such that the AC power supplied from the power supply circuit 41-1 is transmitted to the receiver coil 61 after passing through all of the plurality of first detection coils 42-1 to 42-$n$. In the present embodiment, as shown in FIG. 4, the output coil is located at the opposite end to the end at which the input coil is located.

The high-pass filter 64 is connected between the resonant circuit 63 and the amplifier 65, and attenuates a noise component having a frequency less than the frequency of the AC power that is supplied from the power supply circuit 41-1 from the AC power received by the resonant circuit 63. The amplifier 65 is connected between the high-pass filter 64 and the half-wave rectifier circuit 66, and amplifies the AC power output by the high-pass filter 64.

The half-wave rectifier circuit 66 is connected between the amplifier 65 and the low-pass filter 67, and converts the amplified AC power output by the amplifier 65 into PDC power through half-wave rectification. The low-pass filter 67 is connected between the half-wave rectifier circuit 66 and the voltage detection circuit 68, and converts the PDC power output by the half-wave rectifier circuit 66 into DC power through smoothing.

The voltage detection circuit 68 is connected to the low-pass filter 67, and detects the voltage (i.e., first voltage) of the DC power output by the low-pass filter 67. The determination circuit 69 determines whether the detected first voltage is included in the predetermined reference range. If the detected first voltage is included in the predetermined reference range, the determination circuit 69 does not detect foreign material between the transmitter coil 12 and the receiver coil 21. On the other hand, when the detected first voltage falls outside the predetermined reference range, the determination circuit 69 determines that there is foreign material that has gotten between the transmitter coil 12 and the receiver coil 21. The determination circuit 69 then outputs a signal indicating the result of foreign material detection to the power supply circuit 11 of the power transmitting apparatus 2. Note that the voltage detection circuit 68 can be configured as any voltage detection circuit for detecting a DC voltage. Also, the determination circuit 69 can be configured as any of various circuits capable of comparing the detected first voltage with the predetermined reference range and outputting a signal that depends on the comparison result.

Accordingly, in the case where the determination circuit 69 of at least one of the detection circuit 46-1 and detection circuit 46-2 determines that there is foreign material that has gotten between the transmitter coil 12 and the receiver coil 21, the foreign material detection apparatus 4 detects the foreign material that has gotten between the transmitter coil 12 and the receiver coil 21.

Figure 7:
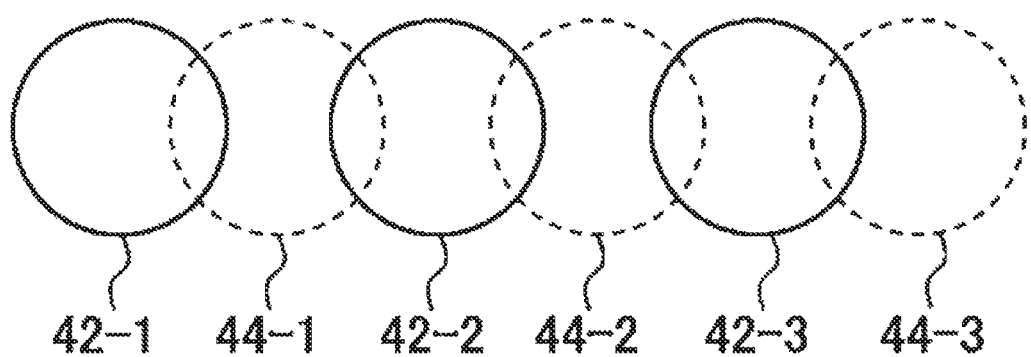
FIG. 7 is a diagram showing an example of the arrangement of first and second detection coils used in simulation illustrating the change in frequency characteristics of the voltage detected by the detection circuit depending on the presence or absence of foreign material contamination.
Figure 8:
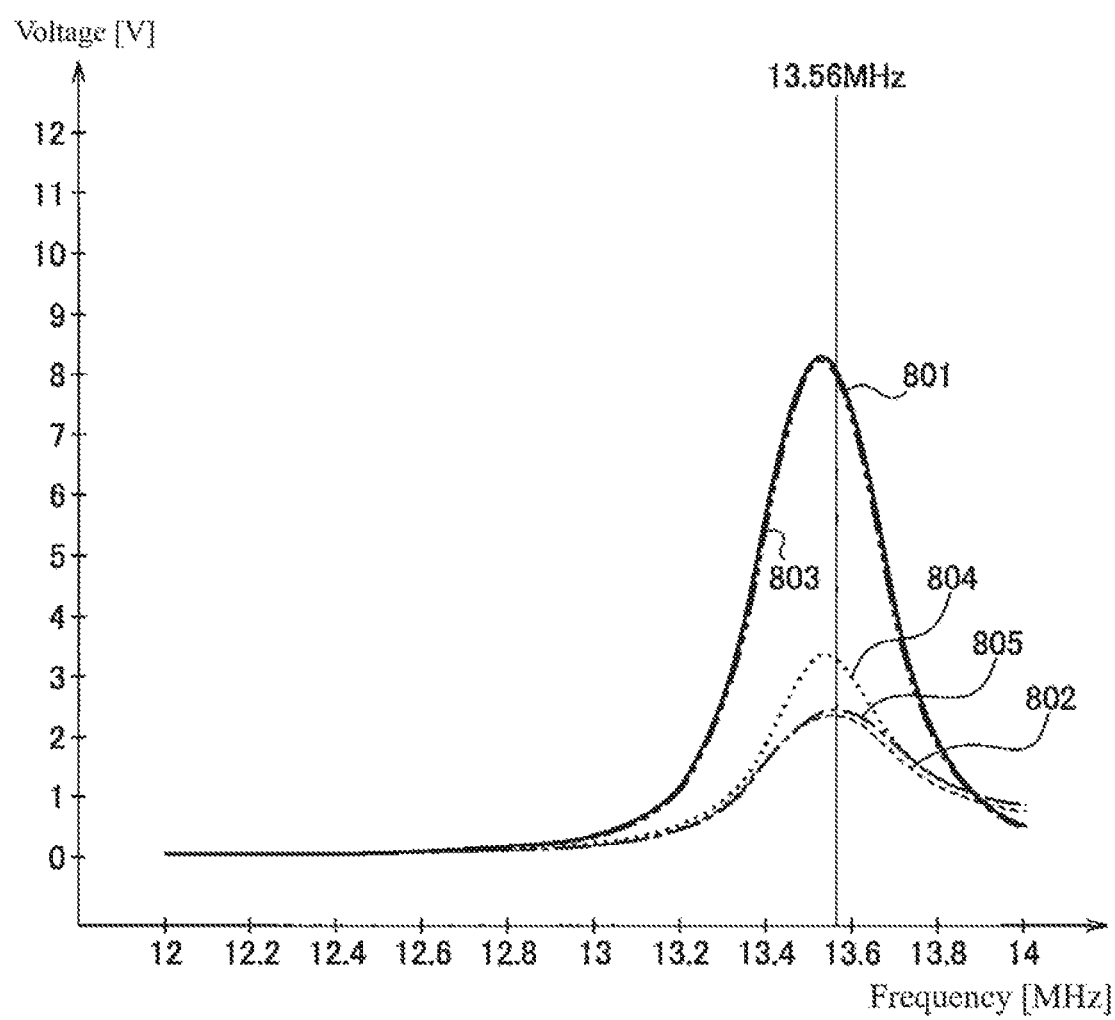
FIG. 8 is a diagram showing an example of the result of simulation illustrating the change in frequency characteristics of the detection voltage of the detection circuit depending on the presence or absence of foreign material contamination, relative to AC power that is transmitted between the first detection coils.
Figure 9:
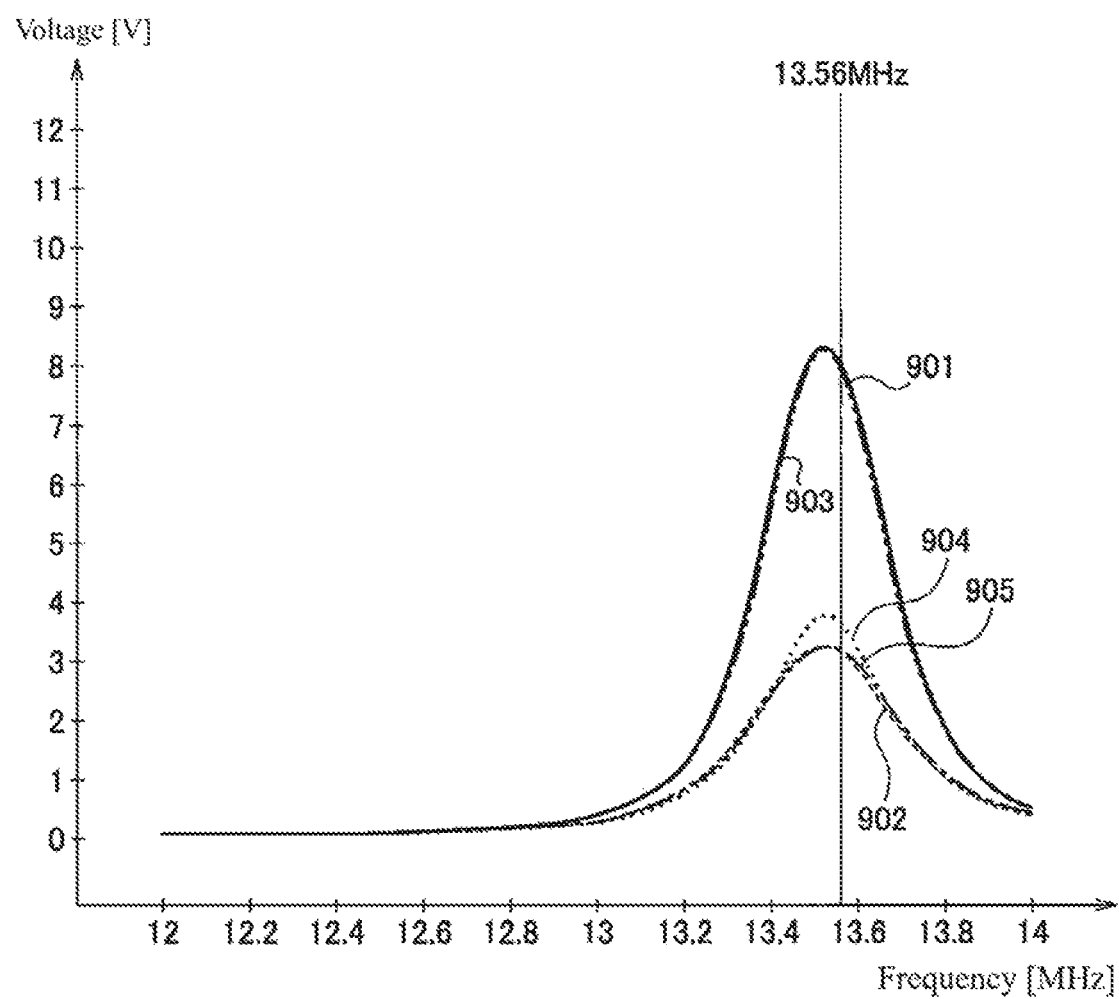
FIG. 9 is a diagram showing an example of the result of simulation illustrating the change in frequency characteristics of the detection voltage of the detection circuit depending on the presence or absence of foreign material contamination, relative to AC power that is transmitted between the first detection coils.
Figure 10:
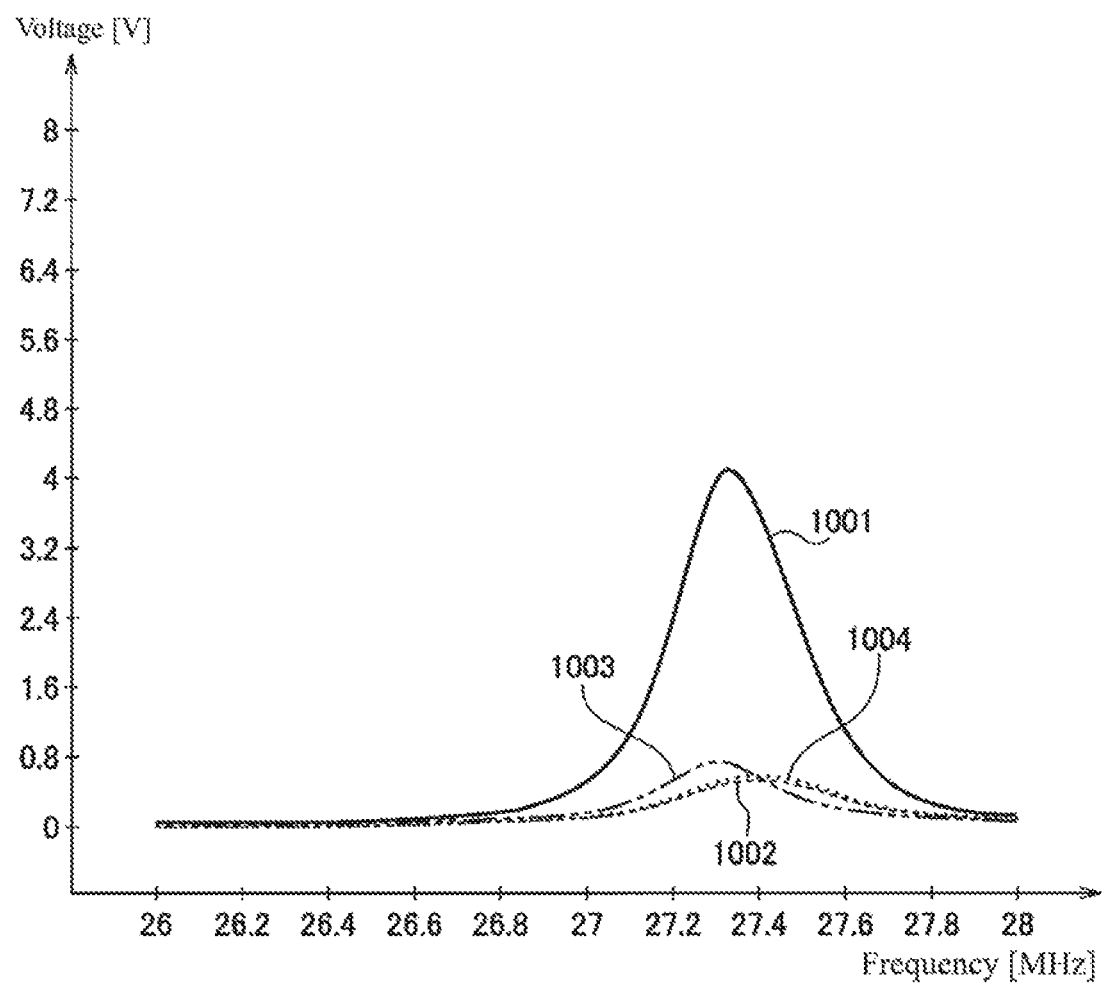
FIG. 10 is a diagram showing an example of the result of simulation illustrating the change in frequency characteristics of the detection voltage of the detection circuit depending on the presence or absence of foreign material contamination, relative to AC power that is transmitted between the second detection coils.
Figure 11:
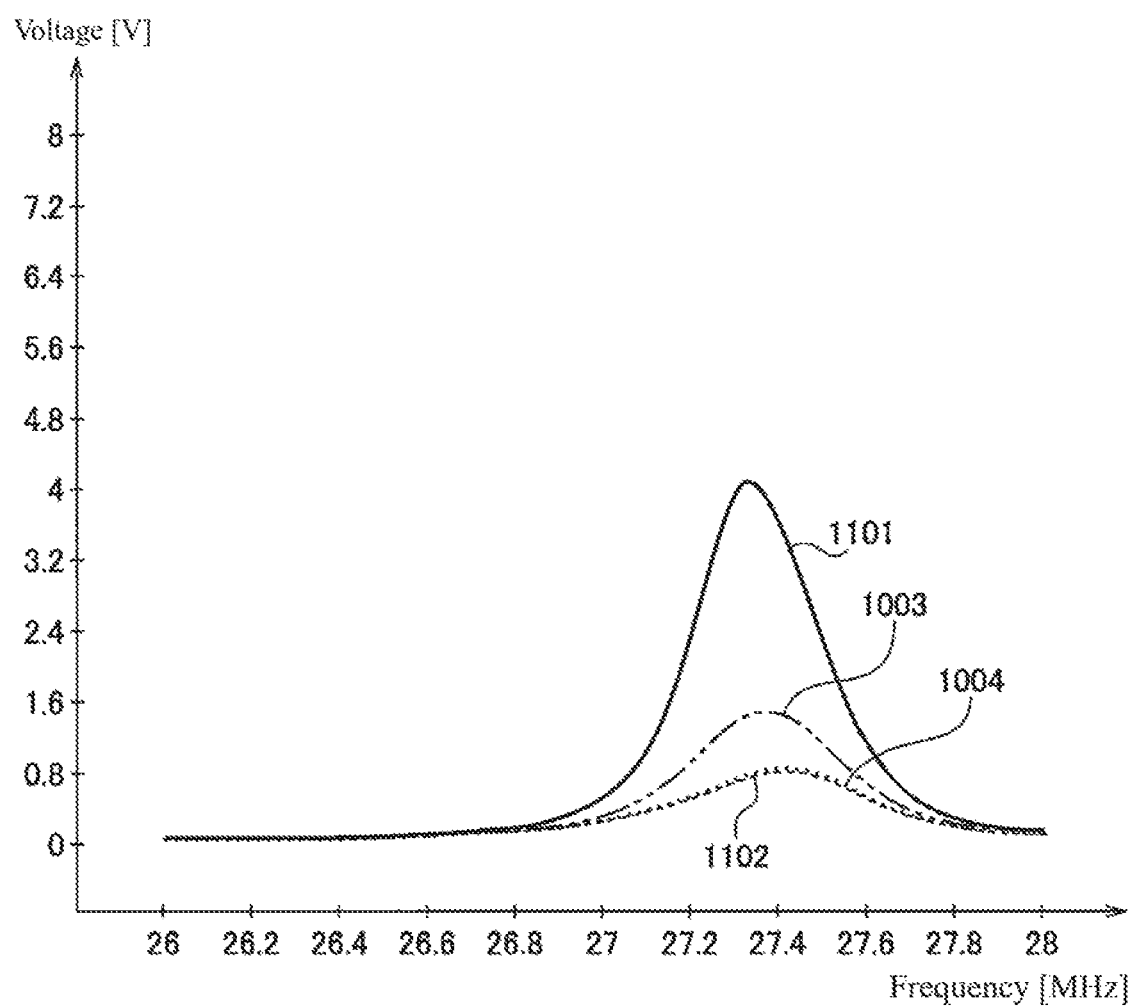
FIG. 11 is a diagram showing an example of the result of simulation illustrating the change in frequency characteristics of the detection voltage of the detection circuit depending on the presence or absence of foreign material contamination, relative to AC power that is transmitted between the second detection coils.

FIG. 7 is a diagram showing an example of the arrangement of the first and second detection coils used in simulation illustrating the change in frequency characteristics of voltages (hereinafter, simply referred to as detection voltages) that is detected by the detection circuits 46-1 and 46-2 depending on the presence or absence of foreign material contamination. FIGS. 8 and 9 are diagrams showing an example of the result of simulation illustrating the change in frequency characteristics of a first voltage (hereinafter, referred to for convenience as the first detection voltage) that is detected by the detection circuit 46-1 depending on the presence or absence of foreign material contamination. Also, FIGS. 10 and 11 are diagrams showing an example of the result of simulation illustrating the change in frequency characteristics of a second voltage (hereinafter, referred to for convenience as the second detection voltage) detected by the detection circuit 46-2 depending on the presence or absence of foreign material contamination. In this simulation, for simplification, as shown in FIG. 7, the number of first detection coils and the number of second detection coils are set to three each (i.e., m=n=3), and the first detection coils 42-1 to 42-3 and the second detection coils 44-1 to 44-3 are alternately aligned between the power supply circuits 41-1 and 41-2 and the detection circuits 46-1 and 46-2. Also, the first detection coils 42-1 to 42-3 are arranged on the front surface of the substrate 47, whereas the second detection coils 44-1 to 44-3 are arranged at the back surface of the substrate 47. Furthermore, in this simulation, an inductance L of each detection coil was 50 nH, a capacitance C1 of each of the first detection coils 42-1 to 4-3 and the first capacitors 43-1 to 43-3 constituting the first resonant circuits was 2.755 nF, and a capacitance C2 of each of the detection coils 44-1 to 44-3 and the second capacitors 45-1 to 45-3 constituting the second resonant circuits was C1/4. Also, a resistance R of the resonant circuit that is constituted by each detection coil and the corresponding capacitor was 0.1 Ω. That is, the first resonant frequency of each of the first resonant circuits will be 13.56 MHz, and the second resonant frequency of each of the second resonant circuits will be 27.12 MHz. Also, the degree of coupling between two adjacent first detection coils and the degree of coupling between the two adjacent second detection coils were each 0.01. Also, the degree of coupling between the first detection coil 42-1 and the first detection coil 42-3 and the degree of coupling between the second detection coil 44-1 and the second detection coil 44-3 were each 0.0001. Furthermore, in this simulation, it was assumed that foreign material has gotten into a location corresponding to near one of the detection coils, such as within the winding of one of the detection coils, for example, and, as a result, the inductance of the detection coil near the foreign material or the resistance of the resonant circuit including that detection coil changes.

In FIGS. 8 to 11, the horizontal axis represents frequency and the vertical axis represents detection voltage. A graph 801 in FIG. 8 represents the frequency characteristics of the first detection voltage in the case where there is no foreign material between the transmitter coil 12 and the receiver coil 21. A graph 802 represents the frequency characteristics of the first detection voltage in the case where it is assumed that the inductance of the first detection coil 42-1 decreased by 10%, due to foreign material contamination near the first detection coil 42-1 (e.g., within the winding of the first detection coil 42-1). Also, a graph 803 represents the frequency characteristics of the first detection voltage in the case where it is assumed that the inductance of the second detection coil 44-1 decreased by 10%, due to foreign material contamination near the second detection coil 44-1. Furthermore, a graph 804 represents the frequency characteristics of the first detection voltage in the case where it is assumed that the inductance of the first detection coil 42-2 decreased by 10%, due to foreign material contamination near the first detection coil 42-2. Furthermore, a graph 805 represents the frequency characteristics of the first detection voltage in the case where it is assumed that the inductance of the first detection coil 42-3 decreased by 10%, due to foreign material contamination near the first detection coil 42-3.

As shown in the graphs 801, 802, 804 and 805, it was found that the frequency characteristics of the first detection voltage in the case where it is assumed that there is foreign material contamination near one of the first detection coils 42-1 to 42-3, between the transmitter coil 12 and the receiver coil 21, deteriorate compared with the frequency characteristics of the first detection voltage in the case where there is no such foreign material. In particular, in the case where AC power having a frequency equal to the first resonant frequency (13.56 MHz) of each of the first resonant circuits is supplied from the power supply circuit 41-1, the change in voltage will be marked. Accordingly, it was found that the foreign material detection apparatus 4, by examining the first detection voltage, is able to detect foreign material contamination near any of the first detection coils 42-1 to 42-3 between the transmitter coil 12 and the receiver coil 21.

On the other hand, as shown in the graph 803, it was found that the frequency characteristics of the first detection voltage in the case where it is assumed that there is foreign material contamination near the second detection coil 44-1, between the transmitter coil 12 and the receiver coil 21, that is, in the case where it is assumed that foreign material is located outside of the windings of each of the first detection coils, are substantially the same as the frequency characteristics of the first detection voltage in the case where there is no such foreign material. Thus, in the case where there is foreign material contamination near any of the second detection coils 44-1 to 44-3, the foreign material detection apparatus 4 may possibly not be able to detect foreign material contamination in such a location, when the first detection voltage is examined.

A graph 901 in FIG. 9 represents the frequency characteristics of the first detection voltage in the case where there is no foreign material between the transmitter coil 12 and the receiver coil 21. A graph 902 represents the frequency characteristics of the detection voltage in the case where it is assumed that the resistance of the resonant circuit including the first detection coil 42-1 increased three fold as a result of loss that occurred due to foreign material contamination near the first detection coil 42-1. Also, a graph 903 represents the frequency characteristics of the detection voltage in the case where it is assumed that the resistance of the resonant circuit including the second detection coil 44-1 increased three fold as a result of loss that occurred due to foreign material contamination near the second detection coil 44-1. Furthermore, a graph 904 represents the frequency characteristics of the detection voltage in the case where it is assumed that the resistance of the resonant circuit including the first detection coil 42-2 increased three fold as a result of loss that occurred due to foreign material contamination near the first detection coil 42-2. Furthermore, a graph 905 represents the frequency characteristics of the detection voltage in the case where it is assumed that the resistance of the resonant circuit including the first detection coil 42-3 increased three fold as a result of loss that occurred due to foreign material contamination near the first detection coil 42-3.

As shown in the graphs 901, 902, 904 and 905, in these cases, it was also found that the frequency characteristics of the first detection voltage in the case where it is assumed that there is foreign material contamination near one of the first detection coils 42-1 to 42-3, between the transmitter coil 12 and the receiver coil 21, deteriorate compared with the frequency characteristics of the first detection voltage in the case where there is no such foreign material. In particular, in the case where AC power having a frequency equal to the first resonant frequency (13.56 MHz) is supplied from the power supply circuit 41-1, the change in voltage will be marked. Accordingly, in this case, it was also found that the foreign material detection apparatus 4, by examining the first detection voltage, is able to detect foreign material contamination near any of the first detection coils 42-1 to 42-3 between the transmitter coil 12 and the receiver coil 21.

On the other hand, as shown in the graph 903, it was found that the frequency characteristics of the first detection voltage in the case where it is assumed that there is foreign material contamination near the second detection coil 44-1, between the transmitter coil 12 and the receiver coil 21, are substantially the same as the frequency characteristics of the first detection voltage in the case where there is no such foreign material. Thus, in the case where there is foreign material contamination near any of the second detection coils 44-1 to 44-3, the foreign material detection apparatus 4 may possibly not be able to detect foreign material contamination in such a location, when the first detection voltage is examined.

A graph 1001 in FIG. 10 represents the frequency characteristics of the second detection voltage in the case where there is no foreign material between the transmitter coil 12 and the receiver coil 21. A graph 1002 represents the frequency characteristics of the second detection voltage in the case where it is assumed that the inductance of the second detection coil 44-1 decreased by 10%, due to foreign material contamination near the second detection coil 44-1 (e.g., within the windings of the second detection coil 44-1). Also, a graph 1003 represents the frequency characteristics of the second detection voltage in the case where it is assumed that the inductance of the second detection coil 44-2 decreased by 10%, due to foreign material contamination near the second detection coil 44-2. Furthermore, a graph 1004 represents the frequency characteristics of the second detection voltage in the case where it is assumed that the inductance of the second detection coil 44-3 decreased by 10%, due to foreign material contamination near the second detection coil 44-3.

As shown in the graphs 1001 to 1004, it was found that the frequency characteristics of the second detection voltage in the case where it is assumed that there is foreign material contamination near one of the second detection coil 44-1 to 44-3, between the transmitter coil 12 and the receiver coil 21, deteriorate compared with the frequency characteristics of the second detection voltage in the case where there is no such foreign material. In particular, in the case where AC power having a frequency equal to the second resonant frequency (27.12 MHz) of each of the second resonant circuits is supplied from the power supply circuit 41-2, the change in voltage will be marked. Accordingly, it was found that the foreign material detection apparatus 4, by examining the second detection voltage, is able to detect foreign material contamination near any of the second detection coils 44-1 to 44-3 between the transmitter coil 12 and the receiver coil 21.

A graph 1101 in FIG. 11 represents the frequency characteristics of the second detection voltage in the case where there is no foreign material between the transmitter coil 12 and the receiver coil 21. A graph 1102 represents the frequency characteristics of the detection voltage in the case where it is assumed that the resistance of the resonant circuit including the second detection coil 44-1 increased three fold as a result of loss that occurred due to foreign material contamination near the second detection coil 44-1. Also, a graph 1103 represents the frequency characteristics of the detection voltage in the case where it is assumed that the resistance of the resonant circuit including the second detection coil 44-2 increased three fold as a result of loss that occurred due to foreign material contamination near the second detection coil 44-2. Furthermore, a graph 1104 represents the frequency characteristics of the detection voltage in the case where it is assumed that the resistance of the resonant circuit including the second detection coil 44-3 increased three fold as a result of loss that occurred due to foreign material contamination near the second detection coil 44-3.

As shown in the graphs 1101 to 1104, in these cases, it was also found that the frequency characteristics of the second detection voltage in the case where it is assumed that there is foreign material contamination near one of the second detection coil 44-1 to 44-3, between the transmitter coil 12 and the receiver coil 21, deteriorate compared with the frequency characteristics of the second detection voltage in the case where there is no such foreign material. In particular, in the case where AC power having a frequency equal to the second resonant frequency (27.12 MHz) is supplied from the power supply circuit 41-2, the change in voltage will be marked. Accordingly, the foreign material detection apparatus 4, by examining the second detection voltage, is able to detect foreign material contamination near any of the second detection coils 44-1 to 44-3 between the transmitter coil 12 and the receiver coil 21.

Accordingly, it was found that the foreign material detection apparatus 4, by examining both the first detection voltage and the second detection voltage, is able to detect the foreign material in the case where there is foreign material contamination near any of the first detection coils 42-1 to 42-3 and second detection coil 44-1 to 44-3.

Note that it is conceivable for the detection coils to be closely arranged such that detection coils adjacent to each other, among the plurality of detection coils provided in the foreign material detection apparatus, partially overlap as viewed from the normal direction of the substrate, for the detection coils to be provided so as to resonate to the same resonant frequency, and for AC power having that resonant frequency to be supplied from one power supply circuit. However, when the detection coils are arranged in this way, variation in magnetic flux between the detection coils that occurs due to the AC power that is supplied increases. As the result, the variation in detection voltage caused by the presence or absence of foreign material near the detection coil also decreases depending on a detection coil.

Figure 12A:
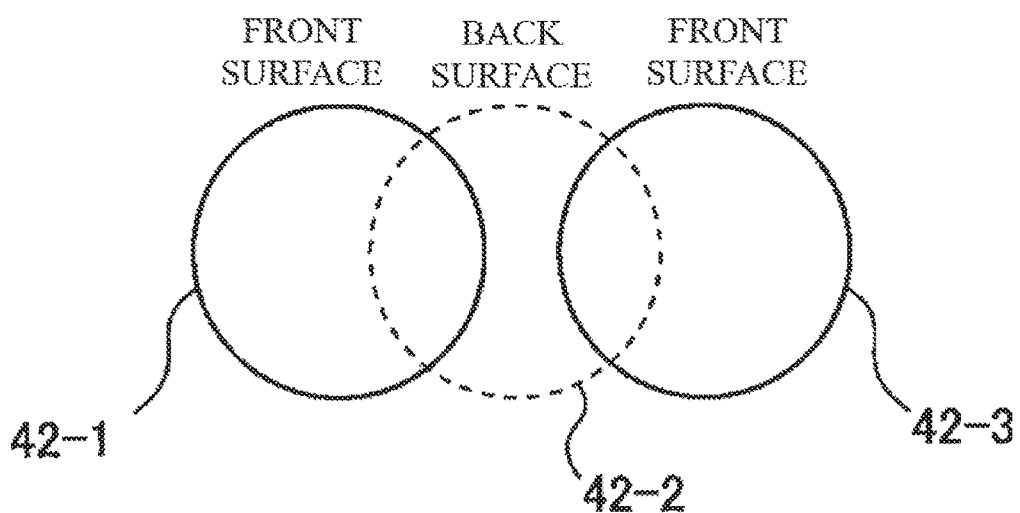
FIGS. 12A and 12B are diagrams showing the result of simulation illustrating the change in frequency characteristics of the detection voltage depending on the presence or absence of foreign material contamination in a comparative example.
Figure 12B:
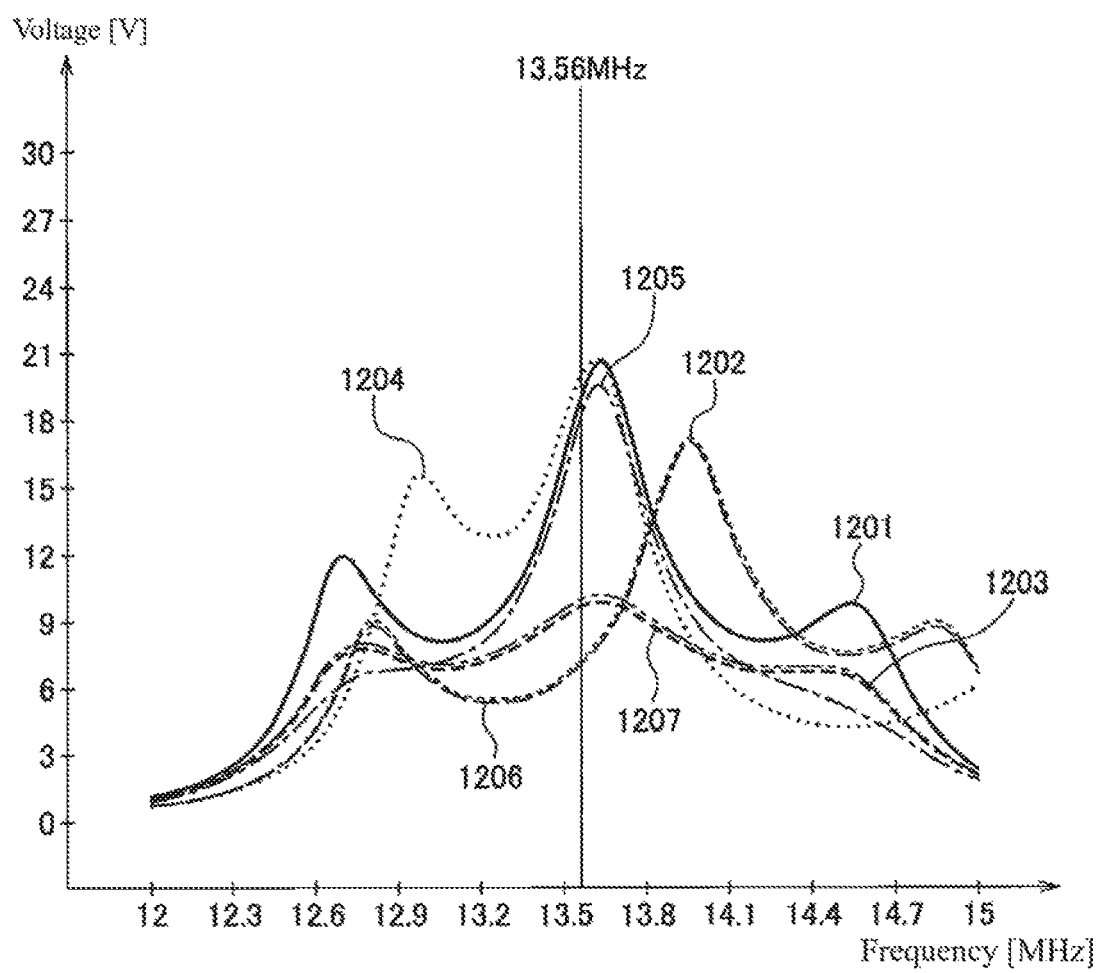

FIGS. 12A and 12B are diagrams showing the result of simulation illustrating the change in frequency characteristics of the detection voltage depending on the presence or absence of foreign material contamination in a comparative example in which detection coils adjacent to each other are closely arranged so as to partially overlap as described above. In this simulation, as shown in FIG. 12A, the number of detection coils 42-1 to 42-$n$ provided in the foreign material detection apparatus according to the comparative example was three (i.e., n=3), and these detection coils 42-1 to 42-3 were aligned between a power supply circuit and a detection circuit. Also, the detection coil 42-1 and the detection coil 42-3 were arranged on the front surface of the substrate 47, whereas the detection coil 42-2 was arranged at the back surface of the substrate 47. Furthermore, in this simulation, the values of the parameters of each circuit element were the same as the values of the parameters used in the simulation shown in FIGS. 7 to 11. That is, the resonant frequency of the resonant circuit constituted by each detection coil and the corresponding capacitor was 13.56 MHz. However, the degree of coupling between the detection coil 42-1 and the detection coil 42-2 and the degree of coupling between the detection coil 42-2 and the detection coil 42-3 were each 0.1, and the degree of coupling between the detection coil 42-1 and the detection coil 42-3 was 0.01.

In FIG. 12B, the horizontal axis represents frequency and the vertical axis represents detection voltage. A graph 1201 represents the frequency characteristics of the detection voltage in the case where there is no foreign material between the transmitter coil 12 and the receiver coil 21. A graph 1202 represents the frequency characteristics of the detection voltage in the case where it is assumed that the inductance of the detection coil 42-1 decreased by 10%, due to foreign material contamination near the detection coil 42-1. Also, a graph 1203 represents the frequency characteristics of the detection voltage in the case where it is assumed that the resistance of the resonant circuit including the detection coil 42-1 increased three fold as a result of loss that occurred due to foreign material contamination near the detection coil 42-1. Similarly, a graph 1204 represents the frequency characteristics of the detection voltage in the case where it is assumed that the inductance of the detection coil 42-2 decreased by 10%, due to foreign material contamination near the detection coil 42-2. Also, a graph 1205 represents the frequency characteristics of the detection voltage in the case where it is assumed that the resistance of the resonant circuit including the detection coil 42-2 increased three fold as a result of loss that occurred due to foreign material contamination near the detection coil 42-2. Furthermore, a graph 1206 represents the frequency characteristics of the detection voltage in the case where it is assumed that the inductance of the detection coil 42-3 decreased by 10%, due to foreign material contamination near the detection coil 42-3. Furthermore, a graph 1207 represents the frequency characteristics of the detection voltage in the case where it is assumed that the resistance of the resonant circuit including the detection coil 42-3 increased three fold as a result of loss that occurred due to foreign material contamination near the detection coil 42-3.

As shown in the graphs 1201 to 1207, in this comparative example, it was found that the frequency characteristics of the detection voltage in the case where there is foreign material contamination near the detection coil 42-1 or the detection coil 42-3 varied relatively greatly compared with the frequency characteristics of the detection voltage in the case where there was no contamination by foreign material. On the other hand, it was found that the frequency characteristics of the detection voltage in the case where there is foreign material contamination near the detection coil 42-2 did not vary that much compared with the frequency characteristics of the detection voltage in the case where there was no contamination by foreign material. In particular, in the case where the power supply circuit supplies AC power having a frequency of 13.56 MHz, which is the resonant frequency of the resonant circuits, the detection voltage hardly varies depending on the presence or absence of foreign material. From this, it was found that the foreign material detection apparatus 4 according to the present embodiment is better able to accurately detect foreign material contamination, regardless of the location of the foreign material, than the comparative example in which adjacent detection coils are closely arranged and AC power of the same frequency is supplied to each detection coil.

As described above, this foreign material detection apparatus, in the case where the power transmitting apparatus and the power receiving apparatus have a positional relationship in which power is transmissible from the power transmitting apparatus to the power receiving apparatus, has a plurality of first detection coils arranged to be inductively couplable with each other and a plurality of second detection coils arranged to be inductively couplable with each other, between a transmitter coil and a receiver coil. Also, first resonant circuits each including a first detection coil have a first resonant frequency, whereas second resonant circuits each including a second detection coil have a second resonant frequency that is different from the first resonant frequency. This foreign material detection apparatus detects a first voltage resulting from AC power supplied to one of the plurality of first detection coils and transmitted through the plurality of first detection coils with a detection circuit. Similarly, this foreign material detection apparatus detects a second voltage resulting from AC power supplied to one of the plurality of second detection coils and transmitted through the plurality of second detection coils with a detection circuit. This foreign material detection apparatus then determines that there is foreign material contamination between the transmitter coil and the receiver coil, in the case where at least one of the first voltage and second voltage falls outside a predetermined reference range. Thus, this foreign material detection apparatus is able to accuracy detect foreign material, even when there is contamination by foreign material smaller than the transmitter coil and the receiver coil. Furthermore, this foreign material detection apparatus is able to accuracy detect the foreign material in the case where the foreign material contamination is located near any of the detection coils. Furthermore, this foreign material detection apparatus detects foreign material using AC power that is separate from the AC power that is transmitted from the power transmitting apparatus to the power receiving apparatus, and is thus able to detect foreign material without being affected by power transmission from the power transmitting apparatus to the power receiving apparatus.

Note that, according to a variation, the foreign material detection apparatus 4 may have one power supply circuit 41, and that one power supply circuit 41 may supply AC power having a first frequency to a first input coil among a plurality of first detection coils, and may supply AC power having a second frequency to a second input coil among a plurality of second detection coils.

Figure 13:
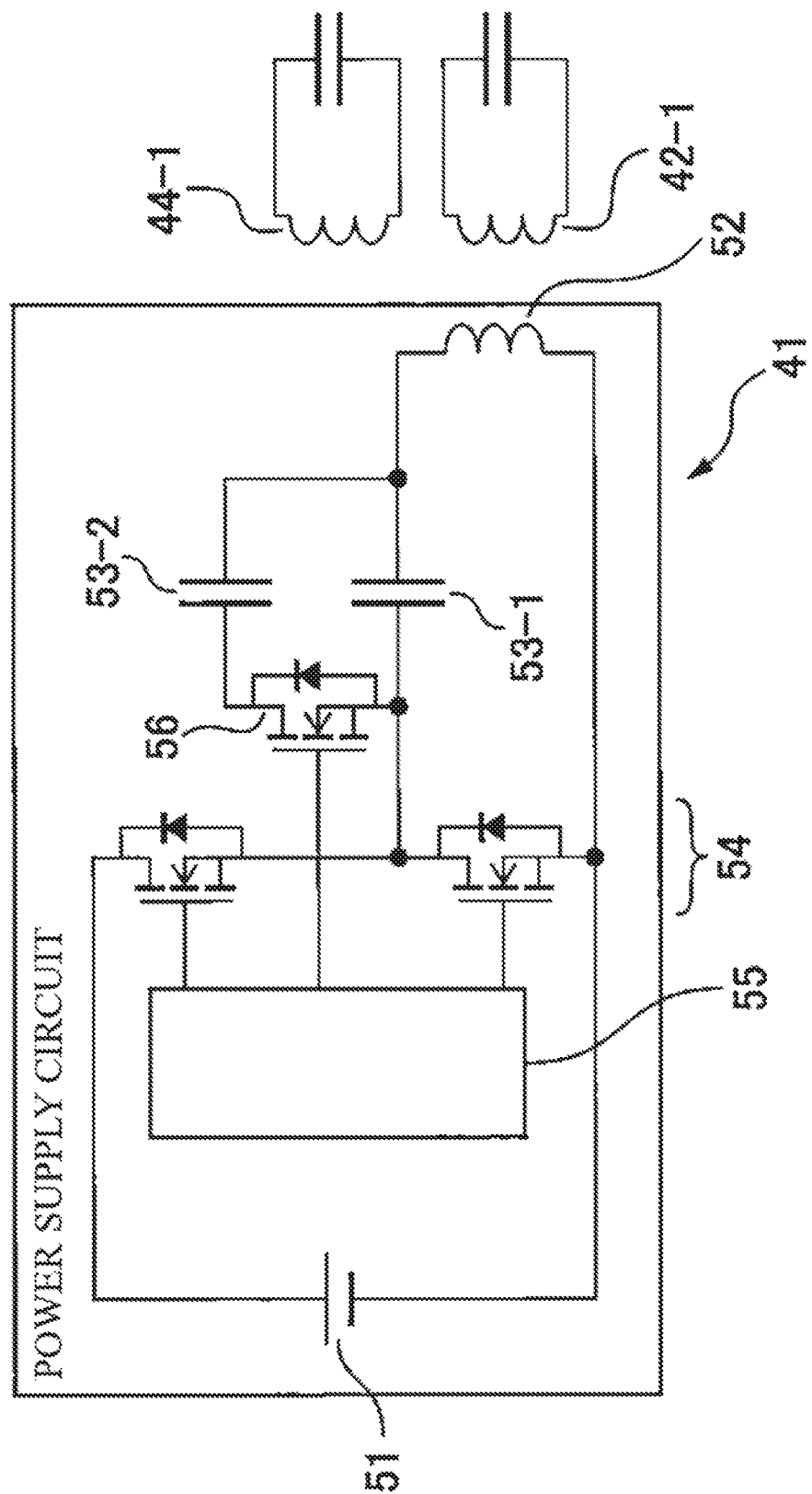
FIG. 13 is a circuit configuration diagram of a power supply circuit according to a variation.

FIG. 13 is a circuit configuration diagram of the power supply circuit 41 according to this variation. The power supply circuit 41 has, for example, a DC power source 51 that supplies DC power, a power supply coil 52, two capacitors 534 and 53-2, an inverter circuit 54, a switching device 56, and a control circuit 55. The power supply circuit 41 according to this variation differs in comparison to the power supply circuit 41-1 shown in FIG. 5 in terms of having the two capacitors 53-1 and 53-2 and the switching device 56, and with regard to part of the control by the control circuit 55. In view of this, description of these differences and other related description will be given below.

The two capacitors 53-1 and 53-2 are connected in parallel with each other and in series with respect to the power supply coil 52. Also, the capacitor 53-2 and the switching device 56 are connected in series. Note that the switching device 56 can, for example, be configured as a MOSFET or a relay. That is, if the switching device 56 is OFF, the capacitor 53-1, out of the two capacitors 53-1 and 53-2, constitutes a resonant circuit together with the power supply coil 52, whereas, if the switching device 56 is ON, the two capacitors 53-1 and 53-2 constitute a resonant circuit with the power supply coil 52. The capacitance of the capacitor 53-1 is, for example, set such that the resonant frequency of the resonant circuit that is constituted by the power supply coil 52 and the capacitor 53-1 achieves the second frequency of AC power that is supplied to the second input coil. Also, the capacitance of the capacitor 53-2 is, for example, set such that the resonant frequency of the resonant circuit that is constituted by the power supply coil 52 and the two capacitors 53-1 and 53-2 achieves the first frequency of the AC power that is supplied to the first input coil.

Furthermore, the power supply coil 52 is arranged such that the first input coil of the plurality of first detection coils and the second input coil of the plurality of second detection coils are inductively couplable.

The control circuit 55 switches ON/OFF of the switching device 56 every predetermined period (being a period longer than a period corresponding to the first frequency and a period corresponding to the second frequency). The control circuit 55 then controls the ON/OFF switching of each switching device of the inverter circuit 54, such that the frequency of AC power that is supplied to the power supply coil 52 achieves the first frequency in the period during which the switching device 56 is ON. Also, the control circuit 55 controls the ON/OFF switching of each switching device of the inverter circuit 54, such that the frequency of AC power that is supplied to the power supply coil 52 achieves the second frequency in the period during which the switching device 56 is OFF. The power supply circuit 41 is thereby able to switch between supply of the AC power having the first frequency to the first input coil and supply of the AC power having the second frequency to the second input coil, every predetermined period.

According to another variation, the foreign material detection apparatus 4 may be attached to the power receiving apparatus 3. In this case, the power receiving apparatus 3 may further have, in parallel with the receiver coil 21, a switching device (not shown) that switches whether to short-circuit both ends of the receiver coil 21, and a control circuit (not shown) for switching whether the switching device is ON or OFF. Signals indicating the results of foreign material detection from the detection circuits 46-1 and 46-2 are output to the control circuit of the power receiving apparatus 3, and the control circuit, in the case where one of these signals indicates that foreign material contamination between the transmitter coil 12 and the receiver coil 21 was detected, turns ON the switching device and short-circuits both ends of the receiver coil 21. Power transmission from the power transmitting apparatus 2 to the power receiving apparatus 3 is thereby interrupted, and malfunction caused by the foreign material contamination is prevented from occurring.

Also, in the case where the power transmitting apparatus 2 and the power receiving apparatus 3 each have a communicator (not shown) for communicating with each other, the control circuit of the power receiving apparatus 3, in the case where one of the signals received from the detection circuits 46-1 and 46-2 of the foreign material detection apparatus 4 indicates that foreign material contamination between the transmitter coil 12 and the receiver coil 21 was detected, may transmit a signal instructing to stop power transmission to the power transmitting apparatus 2, via the communicator. The control circuit of the power supply circuit 11 of the power transmitting apparatus 2 may then stop power supply from the power supply circuit 11 to the transmitter coil 12, upon receiving the signal instructing to stop power transmission via the communicator.

Furthermore, the foreign material detection apparatus 4 may be attached to both the power transmitting apparatus 2 and the power receiving apparatus 3. That is, two foreign material detection apparatuses 4 may be arranged between the transmitter coil 12 and the receiver coil 21.

Furthermore, according to another variation, the foreign material detection apparatus 4 may further have a removal mechanism (not shown) for removing foreign material that has gotten between the transmitter coil 12 and the receiver coil 21. In this case, when one of the detection circuits 46-1 and 46-2 detects foreign material contamination between the transmitter coil 12 and the receiver coil 21, the removal mechanism may be operated to remove the foreign material. Note that such a removal mechanism can, for example, be configured as a wiper that wipes the surface of a casing of the power transmitting apparatus 2 that faces the power receiving apparatus 3, and the surface of a casing of the power receiving apparatus 3 that faces the power transmitting apparatus 2, or as an air gun that blows air between the power transmitting apparatus 2 and the power receiving apparatus 3 to remove the foreign material. The foreign material detection apparatus 4 thereby makes it possible to continue power transmission from the power transmitting apparatus 2 to the power receiving apparatus 3 even if foreign material is detected, while preventing malfunction of the power transmitting apparatus 2 or the power receiving apparatus 3 due to ignition of the foreign material or heat generated by the foreign material.

In this way, those skilled in the art will be able make changes within the scope of the invention according to the mode that is implemented.

The invention claimed is:

1. A foreign material detection apparatus comprising:
a plurality of first detection coils arranged to be inductively couplable with each other, on a substrate arranged between a transmitter coil of a power transmitting apparatus and a receiver coil of a power receiving apparatus between which power is transmitted contactlessly;
a plurality of first capacitors each constituting a first resonant circuit having a first resonant frequency together with a different one of the plurality of first detection coils;
a plurality of second detection coils arranged to be inductively couplable with each other, on the substrate;
a plurality of second capacitors each constituting a second resonant circuit having a second resonant frequency different from the first resonant frequency together with a different one of the plurality of second detection coils;
at least one power supply circuit configured to supply AC power having a first frequency at which each of the first resonant circuits is resonatable to a first input coil among the plurality of first detection coils, and to supply AC power having a second frequency at which each of the second resonant circuits is resonatable to a second input coil among the plurality of second detection coils; and
a detection circuit configured to detect a first voltage of the AC power transmitted via the plurality of first detection coils, from a first output coil different from the first input coil among the plurality of first detection coils, to detect a second voltage of the AC power transmitted via the plurality of second detection coils, from a second output coil different from the second input coil among the plurality of second detection coils, and to detect foreign material contamination between the transmitter coil and the receiver coil according to the detected first voltage or second voltage.

2. The foreign material detection apparatus according to claim 1, wherein the first frequency is a frequency at which each of the second resonant circuits does not resonate, and the second frequency is a frequency at which each of the first resonant circuits does not resonate.

3. The foreign material detection apparatus according to claim 1, wherein the plurality of first detection coils and the plurality of second detection coils are arranged alternately as viewed from a normal direction of the substrate.

4. The foreign material detection apparatus according to claim 3, wherein the first frequency is a frequency at which each of the second resonant circuits does not resonate, and the second frequency is a frequency at which each of the first resonant circuits does not resonate.

\* \* \* \* \*